United States Patent
Takashima et al.

(10) Patent No.: US 10,474,302 B2
(45) Date of Patent: Nov. 12, 2019

(54) TOUCH PANEL DEVICE, PORTABLE TERMINAL, POSITION DETECTING METHOD, AND RECORDING MEDIUM

(71) Applicant: SONY MOBILE COMMUNICATIONS INC., Tokyo (JP)

(72) Inventors: Kouichiro Takashima, Tokyo (JP); Anatol Ward, Tokyo (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 15/836,393

(22) Filed: Dec. 8, 2017

(65) Prior Publication Data
US 2018/0101263 A1     Apr. 12, 2018

Related U.S. Application Data

(62) Division of application No. 13/751,734, filed on Jan. 28, 2013, now abandoned.

(60) Provisional application No. 61/596,762, filed on Feb. 9, 2012.

(51) Int. Cl.
G06F 3/044      (2006.01)
G06F 3/0488    (2013.01)
G06F 3/041      (2006.01)

(52) U.S. Cl.
CPC ............ *G06F 3/044* (2013.01); *G06F 3/0416* (2013.01); *G06F 3/0418* (2013.01); *G06F 3/0488* (2013.01); *G06F 3/04883* (2013.01)

(58) Field of Classification Search
CPC ...... G06F 3/044; G06F 3/0416; G06F 3/0418; G06F 3/0488; G06F 3/04883
See application file for complete search history.

(56) References Cited

U.S. PATENT DOCUMENTS

| | | | |
|---|---|---|---|
| 5,017,030 A | 5/1991 | Crews | |
| 6,323,846 B1 | 11/2001 | Westerman | |
| 6,570,557 B1 | 5/2003 | Westerman | |
| 8,493,334 B2 | 7/2013 | Takashima et al. | |
| 8,610,684 B2 | 12/2013 | Kalu et al. | |
| 8,797,280 B2 | 8/2014 | Simmons et al. | |
| 8,896,548 B2 | 11/2014 | Chang | |
| 8,901,944 B2 * | 12/2014 | Chai | G06F 3/044 324/658 |

(Continued)

FOREIGN PATENT DOCUMENTS

| | | |
|---|---|---|
| EP | 2 077 490 A2 | 12/2005 |
| EP | 2 258 587 A1 | 12/2010 |

(Continued)

OTHER PUBLICATIONS

Partial Search Report dated May 29, 2013 in European Application No. 13152824.2.

(Continued)

*Primary Examiner* — Sejoon Ahn
(74) *Attorney, Agent, or Firm* — Xsensus LLP

(57) ABSTRACT

A touch panel device that detects a touch input at a touch panel including a plurality of electrodes arrayed in X and Y directions, calculates a width corresponding an object approaching the touch panel based on an output distribution of capacitance values from the touch panel, and determines whether an input operation corresponding to the object is valid based on the calculated width of the object.

7 Claims, 29 Drawing Sheets

| PATTERN | 1 | 2 | 3 | 4 | 5 | 6 | 7 |
|---|---|---|---|---|---|---|---|
| F | 10 | 10 | 10 | 10 | 4 | 0 | 0 |
| E | 0 | 0 | 4 | 10 | 4 | 0 | 0 |
| DETERMINATION RESULTS | ON | ON | ON | OFF | OFF | OFF | OFF |

(56) References Cited

U.S. PATENT DOCUMENTS

| | | | |
|---|---|---|---|
| 8,902,174 B1 | 12/2014 | Peterson | |
| 8,902,181 B2 | 12/2014 | Hinckley et al. | |
| 9,081,442 B2* | 7/2015 | Yousefpor | G06F 3/044 |
| 9,201,106 B1* | 12/2015 | Chai | G06F 3/044 |
| 9,678,614 B2* | 6/2017 | Xu | G06F 3/044 |
| 2002/0025837 A1 | 2/2002 | Levy | |
| 2005/0162402 A1 | 7/2005 | Watanachote | |
| 2007/0256915 A1 | 11/2007 | Levy | |
| 2007/0273560 A1 | 11/2007 | Hua | |
| 2008/0012835 A1 | 1/2008 | Rimon et al. | |
| 2008/0012838 A1 | 1/2008 | Rimon | |
| 2008/0036743 A1 | 2/2008 | Westerman | |
| 2008/0158185 A1 | 7/2008 | Westerman | |
| 2008/0284748 A1 | 11/2008 | Hsu | |
| 2008/0284750 A1 | 11/2008 | Hsu | |
| 2008/0284751 A1 | 11/2008 | Hsu | |
| 2008/0284756 A1 | 11/2008 | Hsu | |
| 2009/0045822 A1 | 2/2009 | Nosovitsky | |
| 2009/0174679 A1 | 7/2009 | Westerman | |
| 2009/0295753 A1 | 12/2009 | King et al. | |
| 2009/0322689 A1 | 12/2009 | Kwong | |
| 2010/0117961 A1 | 5/2010 | Westerman | |
| 2010/0127997 A1 | 5/2010 | Park et al. | |
| 2010/0134442 A1 | 6/2010 | Yang et al. | |
| 2010/0139990 A1* | 6/2010 | Westerman | G06F 3/017 178/18.03 |
| 2010/0220066 A1 | 9/2010 | Murphy | |
| 2010/0225604 A1 | 9/2010 | Homma et al. | |
| 2010/0259504 A1* | 10/2010 | Doi | G06F 3/0418 345/174 |
| 2010/0265185 A1 | 10/2010 | Oksanen | |
| 2010/0324841 A1 | 12/2010 | Tasher | |
| 2011/0029185 A1 | 2/2011 | Aoki et al. | |
| 2011/0102351 A1 | 5/2011 | Seo | |
| 2011/0298479 A1 | 12/2011 | Matsushima | |
| 2012/0044166 A1 | 2/2012 | Mizuhashi | |
| 2012/0044198 A1* | 2/2012 | Chai | G06F 3/044 345/174 |
| 2012/0127111 A1 | 5/2012 | Edwards | |
| 2012/0299860 A1 | 11/2012 | Wang et al. | |
| 2013/0222332 A1 | 8/2013 | Kyrynyuk | |
| 2014/0168171 A1* | 6/2014 | Oh | G06F 3/044 345/178 |
| 2015/0116344 A1 | 4/2015 | Won | |
| 2015/0338991 A1* | 11/2015 | Westerman | G06F 3/044 345/178 |

FOREIGN PATENT DOCUMENTS

| | | |
|---|---|---|
| EP | 2 397 934 A2 | 12/2011 |
| JP | 07-306752 | 11/1995 |
| WO | WO 01/95358 A2 | 12/2001 |
| WO | WO 2008/007372 A2 | 1/2008 |
| WO | WO 2011/094936 A1 | 8/2011 |

OTHER PUBLICATIONS

Extended European Search Report dated Oct. 11, 2013 in Patent Application No. 13152824.2.
Chinese Office Action dated Oct. 9, 2016 in Patent Application No. 201310040933.9 with English translation (14 pages).
Extended European Search Report issued on application No. 17156296.0 dated May 29, 2017 (9 pages).

* cited by examiner

FIG. 5

| LIST OF APPLICABLE RANGES | | WIDTH DETECTED IN X DIRECTION | | | | |
|---|---|---|---|---|---|---|
| | | 0 TO 3 mm | 3 TO 7 mm | 7 TO 20 mm | 20 TO 30 mm | GREATER THAN 30 mm |
| WIDTH DETECTED IN Y DIRECTION | 0 TO 3 mm | STYLUS | FINGER | FINGER | GRIPPING EDGES FROM BOTH SIDES | GREATER THAN 30 mm |
| | 3 TO 7 mm | FINGER | FINGER | FINGER | GRIPPING EDGES FROM BOTH SIDES | GRIPPING EDGES FROM BOTH SIDES |
| | 7 TO 20 mm | FINGER | FINGER | FINGER | LARGE FINGER | GRIPPING EDGES FROM BOTH SIDES |
| | 20 TO 30 mm | GRIPPING EDGES FROM BOTH SIDES | GRIPPING EDGES FROM BOTH SIDES | LARGE FINGER | PALM | PALM |
| | GREATER THAN 30 mm | GRIPPING EDGES FROM BOTH SIDES | GRIPPING EDGES FROM BOTH SIDES | PALM | PALM | PALM |

→ EDGE DETECTION

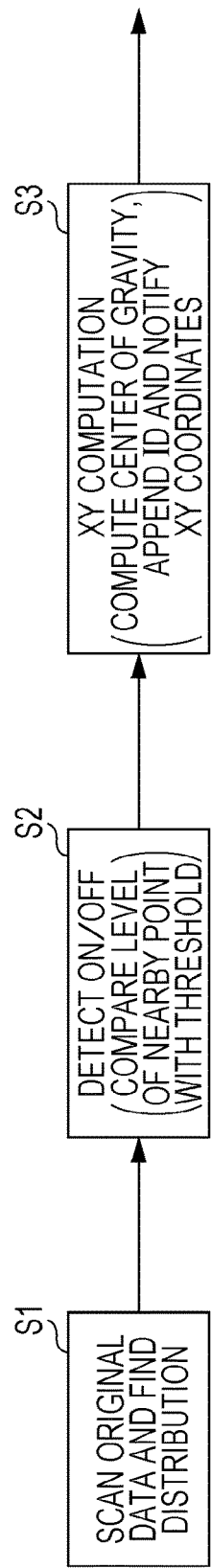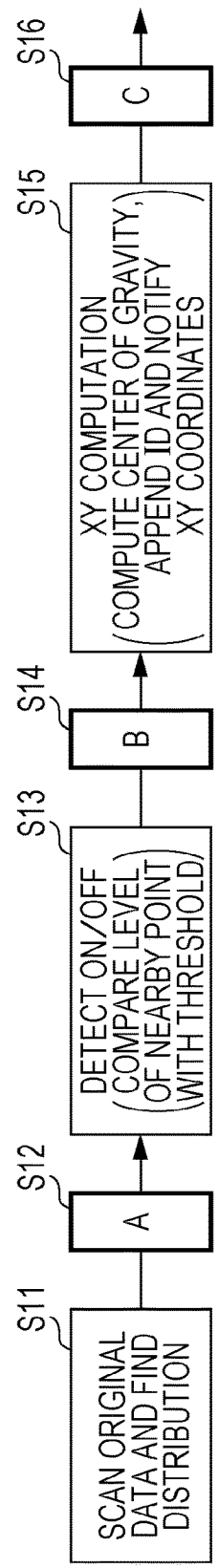

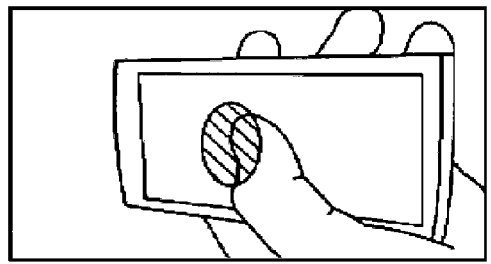
FIG. 7A
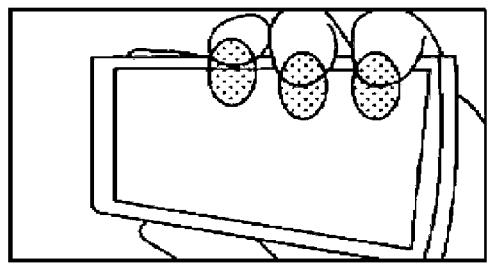
FIG. 7B
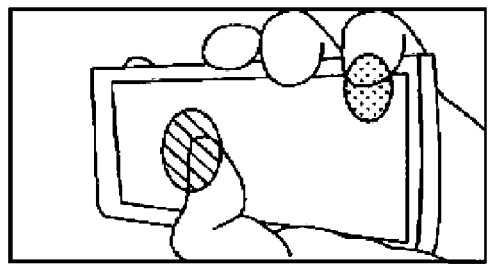 
FIG. 7C  DETECTED
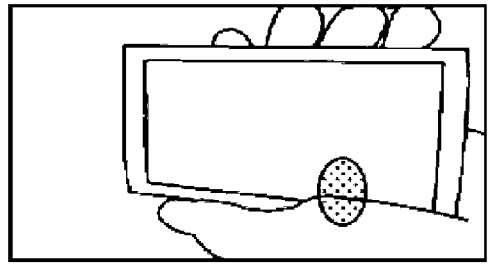 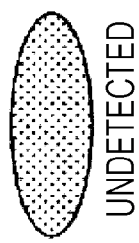
FIG. 7D  UNDETECTED UNINTENDED OPERATION
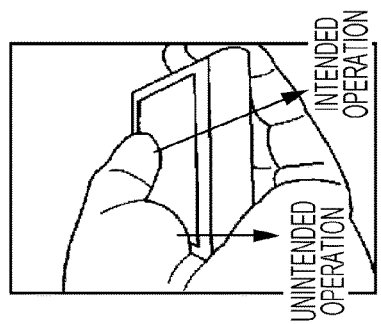
FIG. 8A     FIG. 8B     FIG. 8C
POSITION OF FINGER    DETECTION RANGE
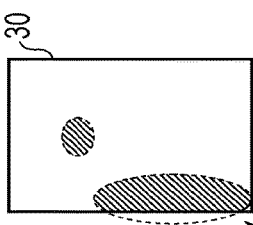
FIG. 8D
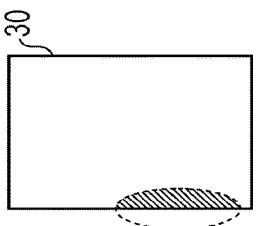
FIG. 8E
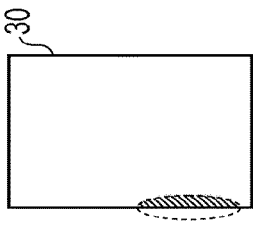
FIG. 8F
CENTER OF GRAVITY MOVES INWARD

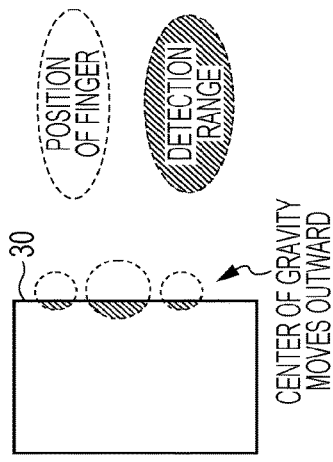
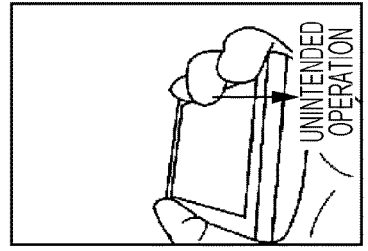
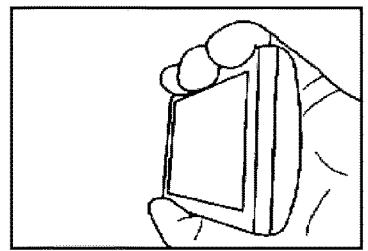
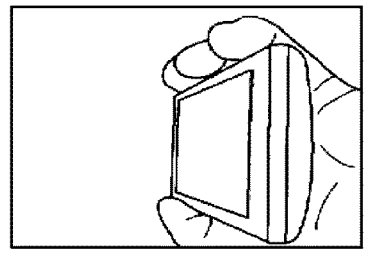
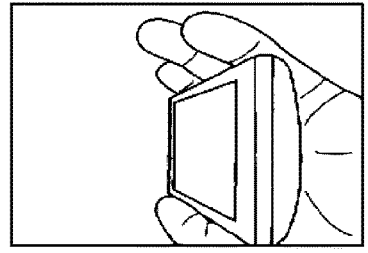
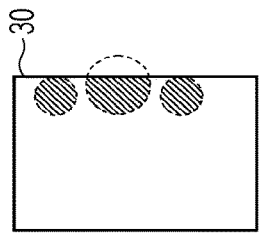
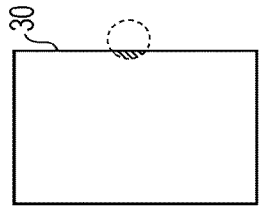
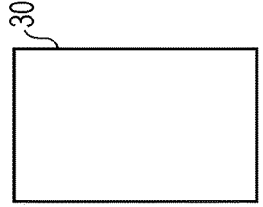
FIG. 9A  FIG. 9B  FIG. 9C  FIG. 9D
FIG. 9E  FIG. 9F  FIG. 9G  FIG. 9H
UNINTENDED OPERATION

INTENDED OPERATION

CENTER OF GRAVITY DOES NOT MOVE

POSITION OF FINGER

DETECTION RANGE

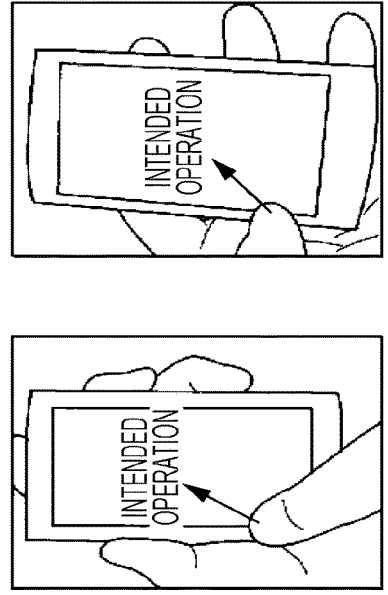
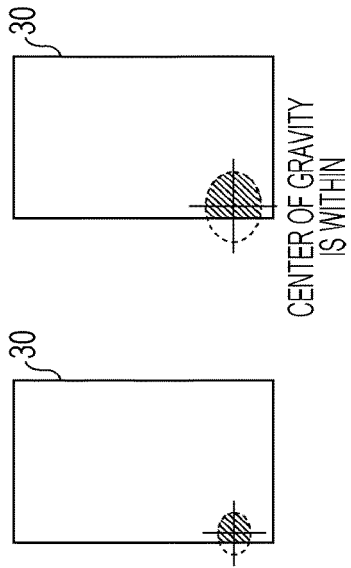

FIG. 12A
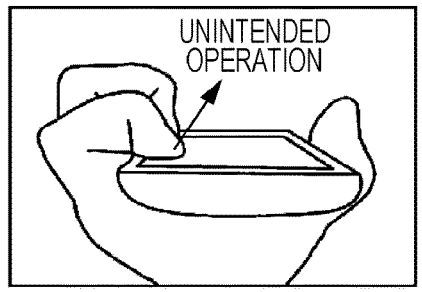
FIG. 12B
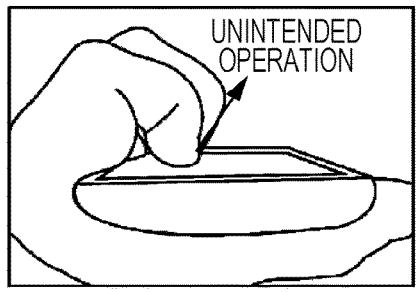
FIG. 12C
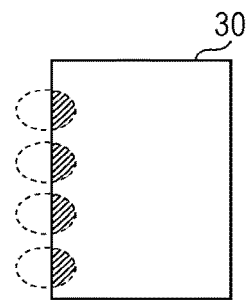
FIG. 12D
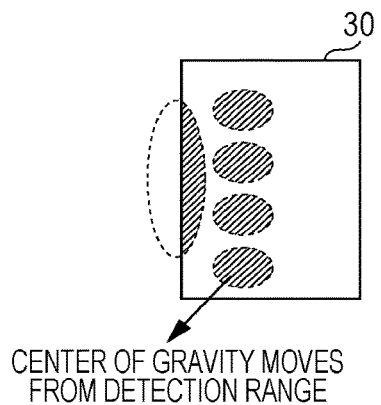
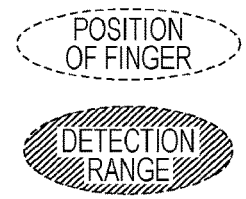

FIG. 13

| | | SIZE | SHAPE | |
|---|---|---|---|---|
| | | | AT TIME OF FIRST CONTACT | AT TIME OF LAST CONTACT |
| INTENDED INPUT | A INDEX FINGER | <7 mm | | |
| | B THUMB | <25 mm | | |
| UNINTENDED INPUT | C GRIPPING EDGES FROM BOTH SIDES | <7 mm | | |
| | D BASE | <35 mm | | |
| | E EXCEPTION | | | |

Legend: DETECTION RANGE FINGER, HAND / GREATEST OUTER SHAPE OF FINGER, HAND

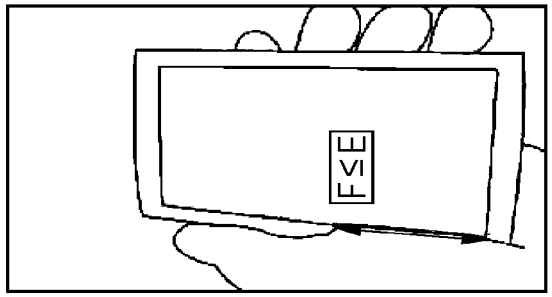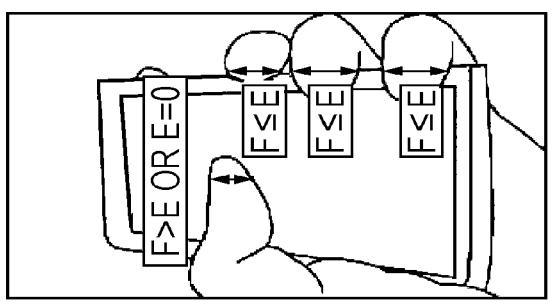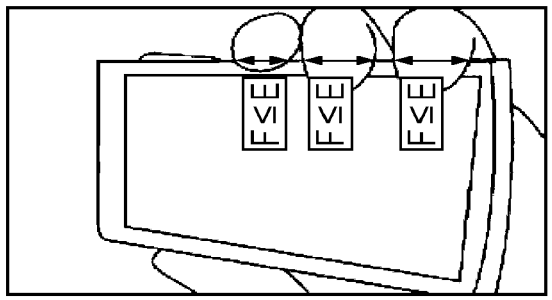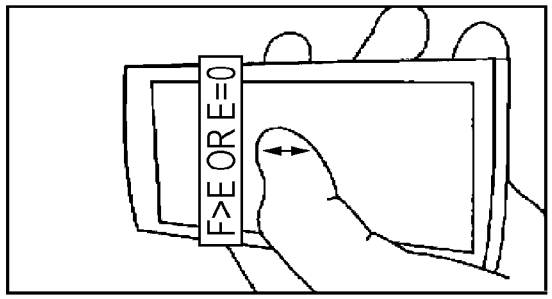

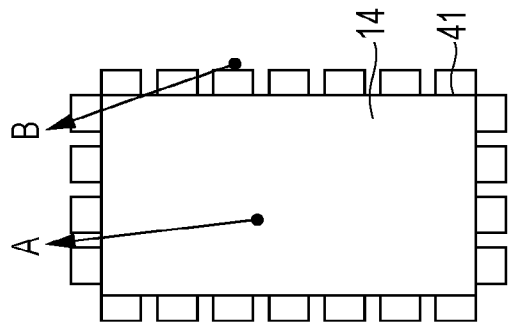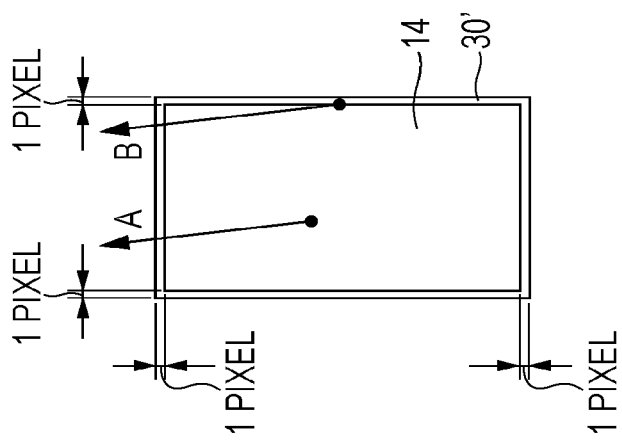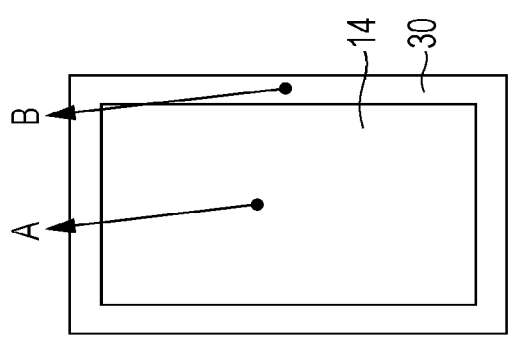

FIG. 22
FINGER SIZE
| PATTERN | 1 | 2 | 3 | 4 | 5 | 6 | |
|---|---|---|---|---|---|---|---|
| INTENDED OPERATION | STYLUS PEN | SMALL INDEX FINGER OF AN INFANT | SMALL INDEX FINGER | INDEX FINGER | THUMB | LARGE THUMB | RANGE |
| SHAPE | ∘ | ⊘ | ⊘ | ● | ● | ● | |
| wX[mm] | 1 | 3 | 3 | 7 | 20 | 20 | 1 TO 20 |
| wY[mm] | 1 | 3 | 7 | 7 | 20 | 25 | 1 TO 25 |
| wY/wX | 1 | 1 | 0.42 | 1 | 1 | 1.25 | 0.42 TO 1.25 |
| PATTERN | 7 | 8 | 9 | |
|---|---|---|---|---|
| UNINTENDED OPERATION | BASE OF HAND | THUMB THAT IS GRIPPING | OTHER FINGERS THAT ARE GRIPPING | RANGE |
| SHAPE | ⌒ | ◗ | ◡ | |
| wX[mm] | 5 | 10 | 3.5 | 3.5 TO 10 |
| wY[mm] | 3.5 | 20 | 7 | 7 TO 3.5 |
| wY/wX | 7 | 2 | 2 | 2 TO 7 |
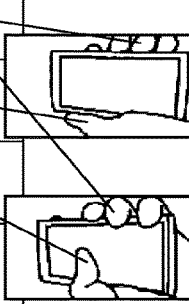

FIG. 29

······ THRESHOLD FOR DETERMINATION OF CONTACT
── THRESHOLD FOR EXTRACTING DATA FOR CALCULATION OF CENTER-OF-GRAVITY POSITION

| | A | B | C | D | E |
|---|---|---|---|---|---|
| OBJECT | STYLUS PEN | CHILD'S FINGER | NORMAL-SIZED INDEX FINGER | NORMAL-SIZED THUMB | LARGE THUMB |
| | <φ1 | φ3 TO 7 | φ7 | φ20 | φ20 TO 30 |

| | | STYLUS PEN | CHILD'S FINGER | NORMAL-SIZED INDEX FINGER | NORMAL-SIZED THUMB | LARGE THUMB |
|---|---|---|---|---|---|---|
| INPUT | Hm | MAXIMUM HEIGHT | 75 | 80 | 100 | 100 | 130 |
| | Wm | WIDTH OF BASE [mm] | 1 | 3 | 7 | 20 | 30 |
| | Wt | ON THRESHOLD WIDTH [mm] | 0.2 | 1 | 5 | 15 | 25 |
| OUTPUT | Wb | OPTIMAL THRESHOLD WIDTH [mm] | | 5 | | | |
| | Hd | OPTIMAL THRESHOLD HEIGHT | 1 | 10 | 50 | 90 | 130 |

F

TOUCH PANEL DEVICE, PORTABLE TERMINAL, POSITION DETECTING METHOD, AND RECORDING MEDIUM

CROSS REFERENCE TO RELATED APPLICATION

The present application is a divisional of and claims the benefit of priority from U.S. application Ser. No. 13/751,734, filed Jan. 28, 2013, which claims the benefit of priority of U.S. Provisional Patent Application Ser. No. 61/596,762, filed on Feb. 9, 2012, the entire contents of each of which is incorporated herein by reference.

BACKGROUND

Field of the Disclosure

The present disclosure relates to a touch panel device which can detect that an object such as a finger or the like is near on a screen where sensors have been arrayed (includes the object touching. Hereafter also called "touch"), portable terminal, position detecting method, and recording medium.

Description of Related Art

Conventionally, touch panel devices that can be operated by an operator directly touching a screen while images are displayed on the screen have been known, and such a touch panel device is often used in a portable information processing terminal such as a PDA (Personal Digital Assistant), cellular phone terminal, Smartphone, or the like (hereafter called "portable terminal") and various types of home electronic devices and the like. A touch panel device has a touch panel unit to detect an object approaching the surface. Types of touch panel units include a resistor film method that detects resistor value changes to a touched portion, a capacitance type that detects capacitance changes to the touched portion, an electromagnetic conduction method to detect the position of an instruction body with the electromagnetic energy of an instruction body dedicated to emitting a magnetic field, and so forth. Recently, use of capacitance-type touch panel units have increased, particularly in the cellular phone terminal and Smartphone markets.

With conventional portable terminals, a display unit that displays images and icons and so forth on a screen, and a touch panel unit that the user performs touching operations on by using a finger or stylus pen or the like, are formed on the same face. For example, in the event of imaging a subject, the user touches an icon or the like to execute a camera application, and upon having activated the imaging function, touches the icons or the like displayed on the touch panel unit to perform photographing operation of a subject while viewing the display unit.

Japanese Unexamined Patent Application Publication No. 7-306752 describes a technique to detect input operations in a touch region wherein a double-touch has been performed in error at a different location on the touch panel unit, based on position information obtained from a touch area having a smaller area.

SUMMARY

Recently touch panel devices have been provided wherein multiple points are detected and operations enabled even if multiple locations on the touch panel unit are touched simultaneously. Therefore, the technique of selecting one active location from multiple touched locations such as disclosed in Japanese Unexamined Patent Application Publication No. 7-306752 has become less effective.

The touch panel unit is disposed over a wide range on the display panel of the portable terminal. Therefore, if the touch panel portion is disposed to the edge of the portable terminal, unintended input can be made just by the user gripping the edge of the portable terminal or picking up the portable terminal. However, with a touch panel device enabled with multiple point detection, if the opportunity for erroneous operation increases such as another application starting when an application is already being executed or a running application ending due to unintended operations, operability is lost.

Therefore, the inventor has recognized the necessity of determining whether the input operation performed by an object approaching the touch panel is an operation that the user has intended.

According to an embodiment of the present disclosure, a touch panel device is provided that detects a touch input at a touch panel including a plurality of electrodes arrayed in X and Y directions, calculates a width corresponding an object approaching the touch panel based on an output distribution of capacitance values from the touch panel, and determines whether an input operation corresponding to the object is valid based on the calculated width of the object.

According to the present disclosure, determination can be made as to whether input operation of an object is valid or invalid based on the output distribution of capacitance values of an object approaching a touch panel unit. Therefore, operations that the user intended and operations not intended can be distinguished, and input of operations not intended by the user can be ignored. Thus, even in the case of an object approaching the touch panel unit in error, the screen does not switch as a result of the unintended operation, and user operability is increased.

BRIEF DESCRIPTION OF DRAWINGS

FIG. 5 is a descriptive diagram expressing the detection width of objects in the X-direction (horizontal direction) and Y-direction (vertical direction) of the touch panel unit, and the relation of the type of such objects, according to an embodiment of the present disclosure.

FIGS. 6A and 6B are flowcharts describing an example of basic processing according to an embodiment of the present disclosure, and locations for adding first through fourth detecting processing.

FIGS. 7A-7D are descriptive diagrams illustrating an example of user movement that will be detected or not detected as an intended operation, according to an embodiment of the present disclosure.

FIGS. 8A-8F are descriptive diagrams illustrating a first example of a touch operation of a portable terminal, according to an embodiment of the present disclosure.

FIGS. 9A-9H are descriptive diagrams illustrating a second example of a touch operation of a portable terminal, according to an embodiment of the present disclosure.

FIGS. 11A-11H are descriptive diagrams illustrating a fourth example of a touch operation of a portable terminal, according to an embodiment of the present disclosure.

FIGS. 12A-12D are descriptive diagrams illustrating an example of operations that a user intended and operations to be ignored, according to an embodiment of the present disclosure.

FIG. 13 is a diagram schematically showing detection processing of an object according to an embodiment of the present disclosure.

FIGS. 18A-18D are descriptive diagrams showing a situation wherein detection processing of the form of an object is performed in the event that the user holds the portable terminal, according to an embodiment of the present disclosure.

FIGS. 19A-19C is a descriptive diagram illustrating an example of various types of touch panel mechanisms, according to an embodiment of the present disclosure.

FIG. 22 is a descriptive diagram showing an example of detecting the size and shape of an object such as a finger, according to an embodiment of the present disclosure.

FIG. 29 is a descriptive diagram expressing the detection width of objects in the X-direction (horizontal direction) and Y-direction (vertical direction) of the touch panel, and the relation of the type of such objects, according to an embodiment of the present disclosure.

DETAILED DESCRIPTION

Descriptions will be made below about embodiments of the present disclosure (hereafter called embodiments). Note that the description will be given in the following order.
1. First Embodiment (Example of determining whether or not an operation of an object approaching a touch panel unit is an intended operation of a user)
2. Modification 1. First Embodiment

[Example of Determining Whether or not an Operation of an Object Approaching a Touch Panel Unit is an Intended Operation of a User]

Hereafter, a first embodiment of the present disclosure will be described with reference to the appended diagrams. An example will be described below which applies to a portable information processing terminal (portable terminal 1) wherein operation input can be made with a capacitance-type touch panel device (touch panel device 20) that covers roughly the entire face of a display screen. The portable terminal 1 realizes a position detecting method for operation input that a later-described internal block coordinates, by a computer executing a program.

[Schematic Block Configuration of Portable Terminal Having a Touch Panel Device According to the Present Embodiment]

Figure 1:
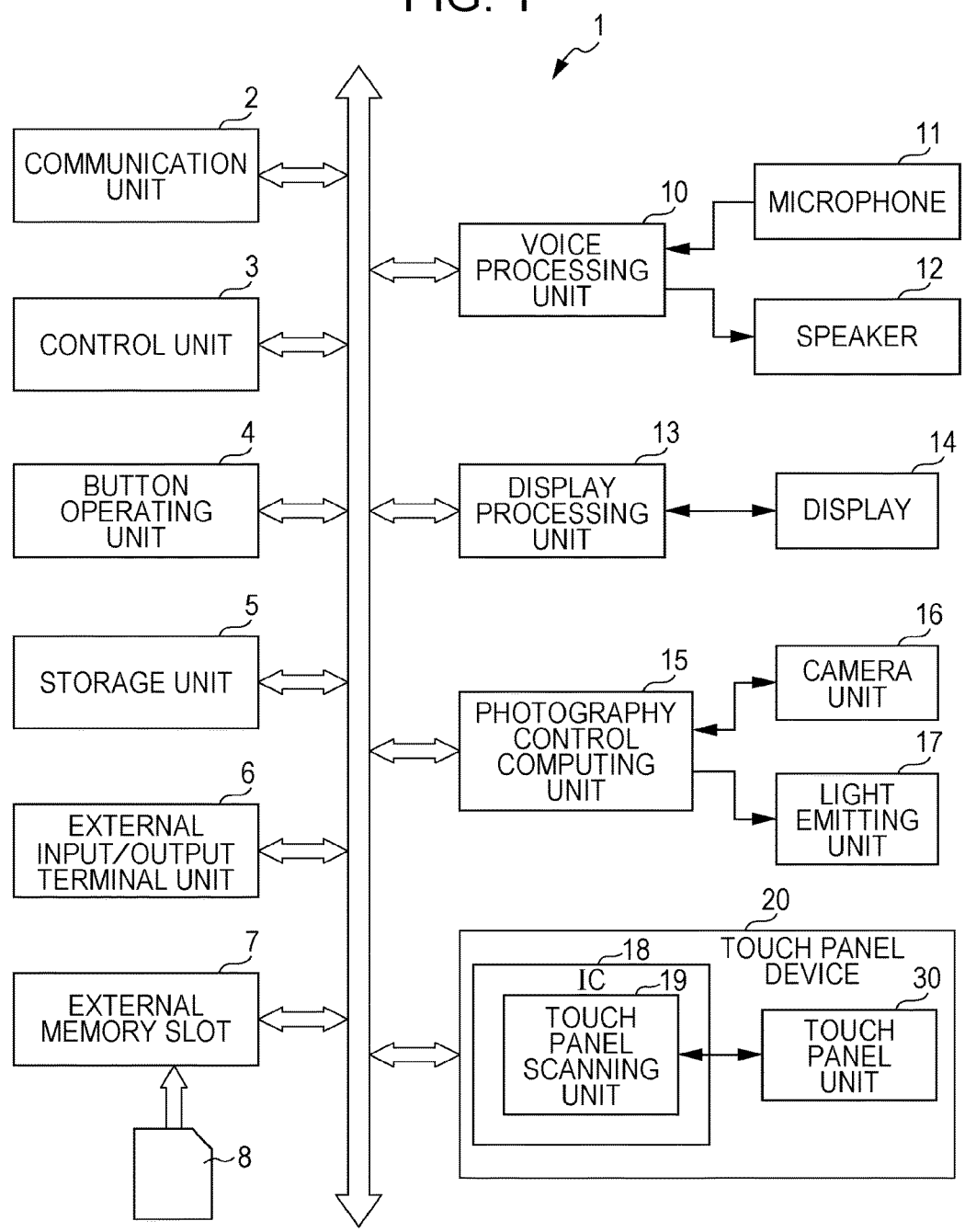
FIG. 1 is a schematic internal block configuration example of a portable terminal having a touch panel device according to an embodiment of the present disclosure.

FIG. 1 shows a schematic internal block configuration example of the portable terminal 1 which has a touch panel device 20. Note that according to the present embodiment, an example is given wherein the touch panel device 20 is applied to the portable terminal 1, but should not be limited to this. As an example, applications to a tablet terminal, gaming device, music playing device, digital camera, and so forth that have a touch panel device 20 can also be made.

The portable terminal 1 has a communication unit 2, control unit 3, button operating unit 4, storage unit 5, external input/output terminal unit 6, and external memory slot 7. Also, the portable terminal 1 has an audio processing unit 10, display processing unit 13, photograph control computing unit 15, IC (integrated circuit) 18, touch panel scanning unit 19, touch panel device 20, and touch panel unit 30.

The communication unit 2 has a communication unit or the like to perform communication through a communication antenna, cellular phone network, or public wireless communication network.

The control unit 3 is made up of a main CPU (central processing unit), and controls the various parts such as the communication unit 2, display processing unit 13, audio processing unit 10, external input/output terminal unit 6, external memory slot 7, photograph control computing unit 15, and IC (integrated circuit) 18, and performs various types of calculations as needed. The control unit 3 executes various types of programs stored in the storage unit 5. Note that execution of the action control program based on output by the touch panel device 20 and the application program is managed by the control unit 3. The button operating unit 4 is made up of a hard key provided on the housing of the portable terminal 1 and peripheral circuits thereof.

The storage unit 5 is made up of a built-in memory that is provided inside the portable terminal 1 and a removable card-shape memory and the like. A removable card-shape memory may be a card that stores SIM (Subscriber Identity Module) information or the like. The built-in memory is made up of ROM (Read Only Memory) that can only be read and RAM (Random Access Memory) that can be rewritten. The ROM stores an SO (Operating System), a control program whereby the control unit 3 controls the parts of the portable terminal 1, various types of application programs including an action control program according to the output of the touch panel device 20, various types of initial setting values, and various types of data and so forth. RAM stores temporary data as a work region and buffer region in the event that the control unit 3 and photograph control computing unit 15 and so forth perform various types of data processing.

The external input/output terminal unit 6 is made up of a cable connection connector and external data communication interface circuit in the event of performing data communication through a cable, for example, or a charging terminal and a charging interface circuit thereof or the like in the event of charging an internal battery through a power cable or the like. The portable terminal 1 can obtain, from an external device connected to the external input/output terminal unit 6, application programs including the action control program according to the present embodiment, and other various types of programs and data.

The external memory slot 7 is made up of an interface circuit and so forth to transmit/receive data and programs and so forth between a memory attaching/removing unit whereby the external memory 8 and the like formed of a semiconductor storage medium can be attached/removed, and the external memory mounted on the memory attaching/removing unit. Note that the external memory 8 may be a recording medium wherein application programs and the like, including the action control program according to the present disclosure, are recorded, and in this case, the portable terminal 1 can obtain the application program or the like from the external memory 8.

The audio processing unit 10 is a processing circuit of the audio signal input/output with the microphone 11 and speaker 12. The microphone 11 is used to collect sound of external audio and collect sound of transmitted audio. The speaker 12 is used to, for example, play music, output received speech, output ringtones, and the like.

The display processing unit 13 has an image signal processing circuit that generates an image signal displayed on a display 14 and a driving circuit that performs display driving of the display 14 based on the image signal thereof. The display 14 is a display panel made up of a liquid crystal panel, organic EL panel, or the like, for example, and display screens such as an email display screen, web screen, text input screen, or the like and still images and moving pictures and the like are displayed.

With control by the control unit 3, the photograph control computing unit 15 performs photographing actions and automatic focusing actions of an autofocus mechanism, automatic diaphragm adjusting actions of an auto iris mechanism, adjusting actions of a shutter speed adjusting mechanism, correcting actions of a vibration correcting mechanism, and so forth of the camera unit 16. Also, by controlling a light-emitting driving circuit of a light-emitting unit 17, the photograph control computing unit 15 causes the light-emitting unit 17 to perform light-emitting operations of photography illumination light and light-emitting operations of photography fill light.

The camera unit 16 has an imaging device to photograph still images and motion pictures, an optical system to form an image of the subject image on the imaging device thereof, an autofocus mechanism to drive the lens of the optical system and perform automatic focusing, an auto iris mechanism to drive the diaphragm of the optical system and perform automatic diaphragm adjustment, a shutter speed adjusting mechanism to adjust the shutter speed mechanically or electronically or the like, a vibration correcting mechanism or the like to correct so-called hand vibrations, and driving circuits or the like to drive various mechanisms.

The light-emitting unit 17 has a light unit made up of an LED or the like to emit the light of photograph illuminating light (e.g. strobe lighting) to light the subject at time of photographing with the camera unit 16, photograph fill light to obtain the brightness to correctly action the autofocus, and so forth. Also, the light-emitting unit 17 has a light emitting driving circuit or the like to drive the light unit to emit light.

The IC 18 is configured to have a touch panel scanning unit 19. The touch panel 30 is a capacitance-type touch panel, wherein multiple transparent electrode units 40X and 40Y are arrayed in the X and Y-directions (see later-described FIG. 2 and FIG. 3). The touch panel scanning unit 19 scans each of the various rectangular shaped transparent electrode units 40X and the various rectangular shaped transparent electrode 40Y in the X-Y transparent electrode pattern unit 31 of the touch panel unit 30, and detects changes to the capacitance in the X-direction and Y-direction. Also, the IC 18 finds the coordinate values of the rectangular shaped transparent electrode units for which capacitance has changed.

The IC 18 is used as a position detecting unit to determine whether the input operation of an object is valid or invalid, based on the output distribution of capacitance values of the touch panel unit 30. Specifically, the IC 18 computes a center of gravity position of an object at a position where an object nears the face of the touch panel unit 30, and from the center of gravity position of the object, determines whether the input operation of an object is valid or invalid. Therefore, the IC 18 determines whether or not the operation is intended by the user, based on the size and shape and so forth of the object that has approached the surface of the touch panel unit 30 and is detected by the touch panel scanning unit 19. The IC 18 computes the center of gravity position and shape and so forth of the object based on information of the obtained coordinate values and changed capacitance values, and determines whether the operation is valid or invalid. The determination result is transmitted to the control unit 3.

As described above, the IC 18 can identify the coordinates (operating position) on the screen of the touch panel unit 30 where an operation has been performed with a finger or the like of the user, by computing the center of gravity position on a contact region between the object and touch panel unit 30. The coordinates rc of the center of gravity position can be computed using the Expression 1 and Expression 2 below, for example. In the various Expressions below, "m" denotes the capacitance value detected with the various transparent electrode units, "M" denotes the sum of the capacitance values detected with the various transparent electrode units, and "ri" denotes the coordinates of the various transparent electrode units.

$$\sum_i m_i = M \quad \text{(Expression 1)}$$

$$r_c = \frac{\sum_i m_i r_i}{M} \quad \text{(Expression 2)}$$

Note that although the diagram thereof is omitted in FIG. 1, the portable terminal 1 has a power management IC that controls the clock portion to measure the time and points-in-time, a battery to supply power to the various parts, and the power thereof. Also, a digital broadcast reception module to receive digital television broadcasts and digital radio broadcasts and so forth is provided. Also, a non-contact communication module to perform non-contact communication used with RFID (Radio Frequency-Identification) or non-contact type IC card or the like is provided. Also, a near field wireless communication unit such as a GPS module that finds the latitude and longitude of the current position of the terminal at hand with a GPS (Global Positioning System) signal from a GPS satellite; a wireless LAN; or Bluetooth (Bluetooth: registered trademark) or the like is provided. Also, various types of sensor units or the like such as a center of gravity sensor, inclination sensor, acceleration sensor, direction sensor, temperature sensor, humidity sensor, lighting sensor and so forth that are generally provided to the various configuration elements provided to the portable terminal 1 are also provided.

[Schematic Configuration of Capacitance-Type Touch Panel]

Figure 2A:
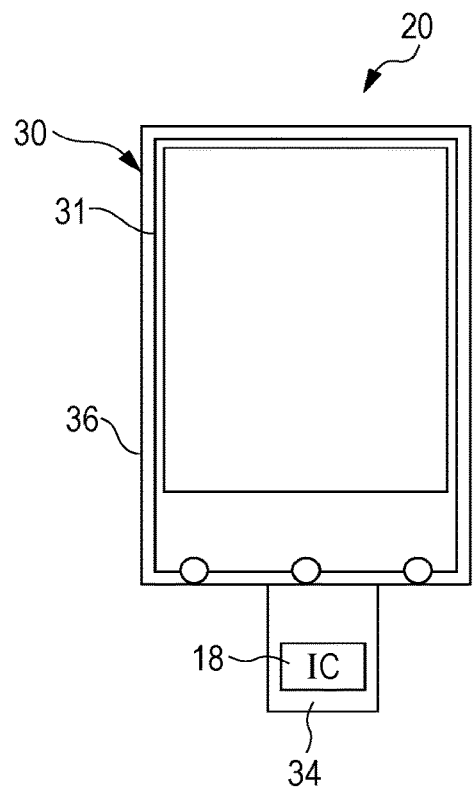
FIGS. 2A and 2B are diagrams illustrating a schematic configuration of a capacitance-type touch panel device according to an embodiment of the present disclosure.
Figure 2B:
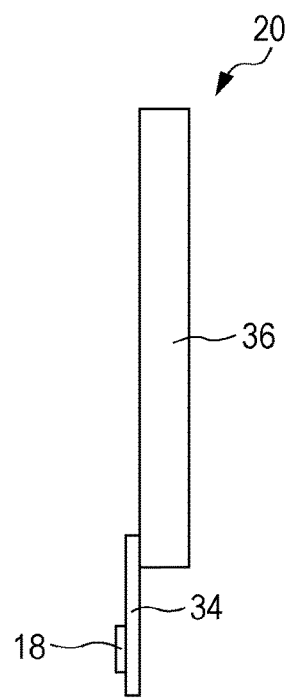

FIG. 2 shows a schematic configuration of a capacitance-type touch panel device 20. Note that FIG. 2A shows a diagram as seeing the touch panel unit 30 from the front, and FIG. 2B shows a diagram as seeing the touch panel unit 30 from the side.

Figure 3:
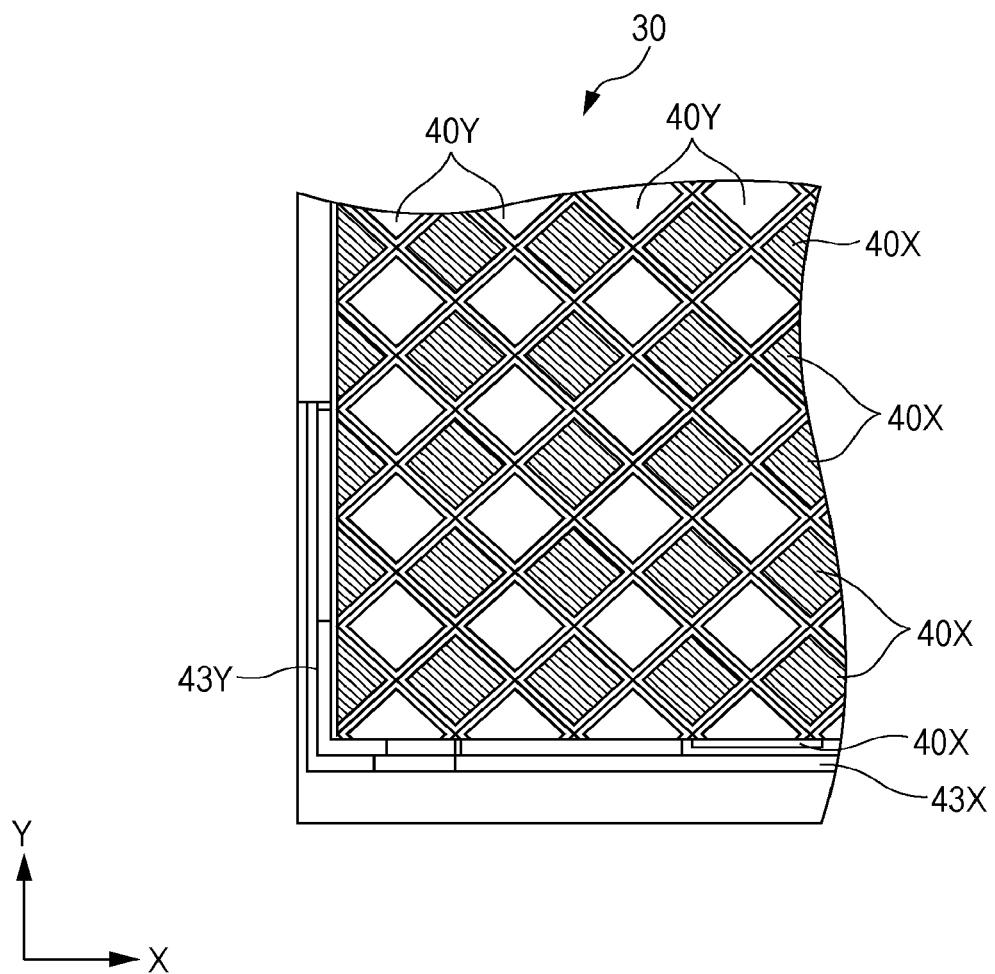
FIG. 3 is a descriptive diagram schematically showing an expanded view of a rectangular transparent electrode unit of a capacitance-type touch panel unit according to an embodiment of the present disclosure.

FIG. 3 is a descriptive diagram schematically showing an expanded view of a rectangular transparent electrode unit of the capacitance-type touch panel unit 30.

The touch panel device 20 has an IC 18, touch panel unit 30, X-Y transparent electrode pattern unit 31, flexible print substrate 34, sensor glass unit 36, and so forth. The touch panel unit 30 is disposed so as to be layered over the display 14 (see FIG. 1).

The X-Y transparent electrode pattern unit 31 is formed on the surface of the sensor glass unit 36 made up of a transparent glass plate. For example, multiple rectangular transparent electrode units 40X are arrayed in the X-direction and in multiple rows, and multiple rectangular transparent electrode units 40Y are arrayed in the Y-direction and in multiple rows.

The various rectangular transparent electrode units 40X arrayed in the X-direction in multiple rows are connected with a connecting unit between the various adjacent rectangular transparent electrode units 40X. Similarly, the rectangular transparent electrode units 40Y arrayed in the Y-direction in multiple rows are connected with a connecting unit between the various adjacent rectangular transparent electrode units 40Y. The various connecting units to connect between the various adjacent rectangular transparent electrode units 40X and the various connecting units to connect between the various adjacent rectangular transparent electrode units 40Y are each formed with a transparent electrode.

Also, the various rectangular transparent electrode units 40X that are on the outer most edges of the various rectangular transparent electrode units 40X are connected in an outer edge wiring pattern 43X, and connected in a wiring pattern of a flexible print substrate 34 via the outer edge wiring pattern 43X. Similarly, the various rectangular transparent electrode units 40Y that are on the outer most edges of the various rectangular transparent electrode units 40Y are connected in an outer edge wiring pattern 43Y, and connected in a wiring pattern of a flexible print substrate 34 via the outer edge wiring pattern 43Y.

The flexible print substrate 34 is formed so as to have a wiring pattern connecting each of the outer wiring pattern 43X and outer edge wiring pattern 43Y of the X-Y transparent electrode pattern unit 31. Note that the flexible print substrate 34 is drawn in a state of being extended over a flat face but in the event of being disposed within the housing of the portable terminal or the like, for example, the touch panel unit 30 is disposed so as to be bent into a predetermined position within the housing of the portable terminal 1.

The IC 18 is mounted on the flexible print substrate 34, and is connected to the outer edge wiring pattern 43X and outer edge wiring pattern 43Y of the X-Y transparent electrode pattern unit 31 via the wiring pattern on the flexible print substrate 34. The IC 18 scans each of the various rectangular transparent electrode units 40X in the X-direction and the various rectangular transparent electrode units 40Y in the Y-direction of the X-Y transparent electrode pattern unit 31, and detects changes in capacitance in the X-direction and Y-direction. The coordinates value and the capacitance detection values when the object such as the finger of the user nears the sensor surface of the touch panel unit 30 and so forth, are calculated by the changes in the detected capacitance.

Figure 4:
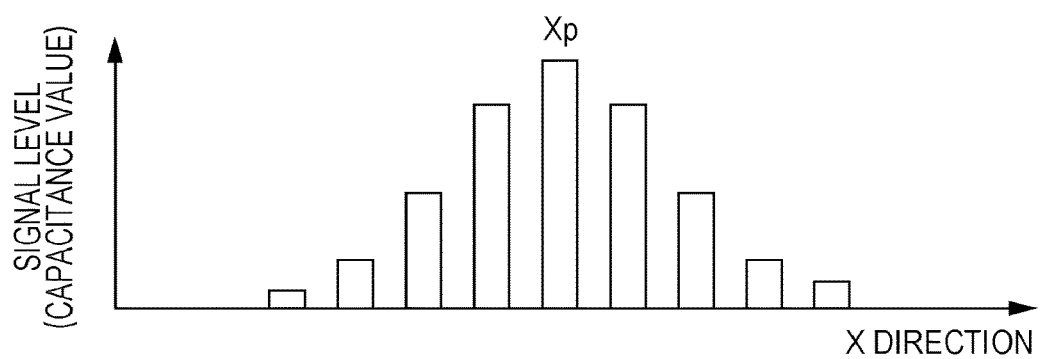
FIG. 4 is a descriptive diagram showing an example of distribution in the X-direction of capacitance value signal levels detected with a touch panel scanning unit according to an embodiment of the present disclosure.

FIG. 4 is a descriptive diagram showing an example of a distribution in the X-direction of the capacitance values, which are formed between the various electrodes of the X-Y transparent electrode pattern unit 31 and the object, detected by the touch panel scanning unit 19. Note that in order to simplify the description herein, description will be given using a one-dimensional distribution chart. Also, FIG. 4 shows only an example of distribution in the X-direction, but actually information of distribution in the Y-axis direction are also referenced together to perform calculations of coordinates of the position where the object is approaching the touch panel unit 30.

The horizontal axis in FIG. 4 shows the X-direction of the X-Y transparent electrode pattern unit 31, and the vertical axis shows the size of the signal level of the detected capacitance values. The capacitance values shown with the vertical axis show the digital values after A/D conversion.

As shown in FIG. 4, the distribution of the capacitance value detected with the touch panel scanning unit 19 is roughly symmetrical left and right, with a peak Xp in the center which is the electrode position wherein the capacitance value is the peak. As the capacitance values used to calculate the center of gravity position, the accuracy to calculate the center of gravity position can be improved by using not only the capacitance values obtained with the peak Xp but also the capacitance values obtained multiple electrodes to the left and right thereof. As the capacitance values used to calculate the center of gravity position, what number of electrodes on the left and right of the peak Xp serving as the center to use, i.e. the number of the capacitance values used to calculate the center of gravity position in the array direction of the electrodes, can be changed by the size of the threshold provided to the signal level of the capacitance values.

According to the present disclosure, the size of the threshold is automatically optimized based on information obtained from the distribution shape in the X-direction and Y-axial direction of the capacitance values detected with the touch panel scanning unit 19. Note that description for only calculations of the center of gravity position in the X-direction of the X-Y transparent electrode pattern unit 31 is given here, but similar calculations are also made for the Y-axis direction, and a final center of gravity position based on the values obtained with both axis directions is computed.

Next, an application range relating to the present embodiment will be described.

FIG. 5 is a descriptive diagram showing the relation between the detection width of an object in the X-direction (horizontal direction) and Y-direction (vertical direction) of the touch panel unit 30 and the type of object thereof.

As to widths of objects that the IC 18 detects in the X-direction and Y-direction, there are five types, which are less than 3 mm, 3 mm or greater but less than 7 mm, 7 mm or greater but less than 20 mm, 20 mm or greater but less than 30 mm, and 30 mm or greater.

(1) In the case that the detection range in the X-direction and Y-direction on the surface of the touch panel unit 30 is less than 3 mm, determination can be made that this is a stylus pen.

(2) In the case that the detection range in the X-direction and Y-direction is 3 mm or greater but less than 7 mm, and that 3 mm or less in the X-direction and Y-direction are excluded, determination can be made that this is a finger of a user.

(3) In the case that the detection range in the X-direction is 7 mm or greater but less than 20 mm, and that the detection range in the Y-direction is 20 mm or greater but less than 30 mm, or the detection range in the Y-direction is 7 mm or greater but less than 20 mm, and the detection range in the Y-direction is 20 mm or greater but less than 30 mm, determination can be made that this is a large digit such as a thumb or the like.

(4) In the case that the detection range in the X-direction is 20 mm or greater and the detection range in the Y-direction is less than 7 mm, or in the case that the detection range in the Y-direction is 20 mm or greater and the detection range in the X-direction is less than 7 mm, determination can be made that the edge of the portable terminal 1 is in the state of being gripped.

(5) In the case that the detection range in the X-direction is 30 mm or greater and the detection range in the Y-direction is 7 mm or greater, in the case that the detection range in the Y-direction is 30 mm or greater and the detection range in the X-direction is 7 mm or greater, or in the case that the detection range in the X-direction is 20 mm or greater and less than 30 mm and that the detection range in the Y-direction is 20 mm or greater and less than 30 mm, determination can be made that this is an entire palm of a hand.

FIG. 6 is a flowchart showing an example of basic processing relating to the present embodiment and positions to add first through fourth detection processing to detect an object approaching the touch panel unit 30. FIG. 6A shows an example of basic processing to detect an object, and FIG. 6B is a flowchart showing locations to add the first through fourth detection processing as to the basic processing.

In the basic processing to detect an object as shown in FIG. 6A, the touch panel scanning unit 19 first scans the surface of the touch panel unit 30 and obtains the original data before the processing (step S1). Information such as the distribution of capacitance that changes on the surface of the touch panel unit 30 described above, and so forth, is included in the original data.

Next, the IC 18 compares the signal level at a point near the object found from the original data and the threshold value, and detects which rectangular transparent electrode unit 40X, 40Y has been turn on or off (step S2). At this time, in the case that the signal level has exceeded the threshold, the IC 18 determines this has been turned on, and when the signal level is less than the threshold level, determines this has been turned off. Thus, the noise and the like occurring on the surface of the touch panel unit 30 and the capacitance value changed with the object operated by the user can be distinguished.

The IC 18 then computes the XY coordinates of the object that has touched the touch panel unit 30 (step S3). At this time, the IC 18 finds the center of gravity of the object, and manages the XY coordinate of the center of gravity by appending a unique ID thereto.

Steps S11, 13, 15 in FIG. 6B are similar processing as the steps S1, 2, 3 in FIG. 6A, respectively. First through fourth detection processing are added as appropriate to one of the locations in steps S12, 14, 16. The first through fourth detection processing here is processing as described below.

(First Detection Processing) Processing to Detect the Shape of an Object:

This is processing to compare the width of an object parallel to the edge of the touch panel unit 30 and the width of an object approaching the edge of the touch panel unit 30.

(Second Detection Processing) Processing to Detect the Size and Shape of an Object:

This is processing to detect the shape of an object, after having calculated the approaching position of the object approaching the surface of the touch panel unit 30, by finding the ratio between the width of an object in the X- and Y-directions and the width in the XY direction.

(Third Detection Processing) Processing to Detect the Position of the Center of Gravity of the Object Multiple Times:

This is processing to detect the position of the center of gravity of an object multiple times and to detect motion or non-motion of the center of gravity of the object.

(Fourth Detection Processing) Processing to Detect the Touch Pattern of the Object:

This is processing to detect a touch pattern in the case that an object nears the detection range having a predetermined width determined on the inner side of the edges of the touch panel unit 30.

The first through fourth detection processing is input into one of the steps S12, S14, or S16 in FIG. 6B. Note that a desirable processing order can be thought of as the order of second, first, third, and fourth detection processing after having found the position of the object center of gravity in steps S14 or S16 in FIG. 6B. Alternatively, with the third detection processing, touches are measured multiple times whereby processing delays can occur, the second, first, and fourth detection processing can be performed in order in steps S14 or S16, without performing the third detection processing. Also, of the first through fourth detection processing, just one of the processing may be input into one of the steps S12, S14, or S16.

Next, FIG. 7 through FIG. 12 will be referenced to describe how a user actually touches the portable terminal 1.

FIG. 7 is a descriptive diagram showing an example of user actions determined as an identified operation being detected or not detected. FIG. 7A shows an example of detecting the operation of a user, and FIG. 7B shows an example of not detecting the operation of a user. Also, FIG. 7C shows an example wherein a range of detecting an operation of a user and a range of not detecting are mixed, and FIG. 7D shows an example of not detecting the operation of a user.

Detecting an operation of a finger touching the vicinity of the center of the touch panel unit 30 is desirable (FIG. 7A).

Not detecting an operation of multiple fingers touching the edge of the touch panel unit 30 is desirable (FIG. 7B).

In the case of simultaneously touching the vicinity of the center and the edge of the touch panel unit 30, detecting the operation of touching the vicinity of the center with the finger and not detecting the operation of touching the edge is desirable (FIG. 7C).

In the case that a portion of the palm of a hand touches the edge of the touch panel unit 30, not detecting this operation is desirable (FIG. 7D).

[First Example of Touching Action]

FIG. 8 is a descriptive diagram showing a first example of a touching action of the portable terminal 1. FIG. 8A through FIG. 8C show an example of the user placing the portable terminal 1 on the palm of the hand and operating the touch panel unit 30 with the thumb, and FIG. 8D through FIG. 8F show the ranges of the IC 18 detecting approaching objects according to the actions shown in FIG. 8A through FIG. 8C. A first example of the touching action shows that an operation not intended by the user is performed. In the diagrams below, the portions surrounded with a dotted line indicate the positions that the hand of the user is touching the touch panel unit 30, and the portion shaded within the dotted lines shows the detection region of the IC 18 detecting an object.

Upon the user placing the portable terminal 1 on the palm of the hand and touching the edge of the portable terminal 1 with the base of the thumb (FIG. 8A), the IC 18 detects that an object has touched the left edge of the touch panel unit 30. Next, upon the user gripping the portable terminal 1 (FIG. 8B), the IC 18 detects the size of the ball of the base of the thumb (FIG. 8E).

Upon the thumb of the user touching the surface of the touch panel unit 30 (FIG. 8C), the IC 18 detects the size of the ball of the base of the thumb and the location that the thumb is touching. Also, the IC 18 detects that the center of gravity of the detection range has moved in the direction of the center of the touch panel unit 30 (FIG. 8F). At such a case the IC 18 determines that the operation of the user is an unintended operation.

[Second Example of Touching Action]

FIG. 9 is a descriptive diagram showing a second example of a touching action of the portable terminal 1. FIG. 9A through FIG. 9D show an example of the user placing the portable terminal 1 on the palm of the hand and operating, and FIG. 9E through FIG. 9H show the ranges that the IC 18 detects according to the actions shown in FIG. 9A through FIG. 9D.

The user places the portable terminal 1 on the palm of the hand, and does not touch anywhere on the touch panel unit 30 (FIG. 9A). At this time, the IC 18 does not detect a touch to the touch panel unit 30 (FIG. 9E). Next, upon the user placing the middle finger on the edge of the portable terminal 1 (FIG. 9B), the IC 18 detects that the tip of the middle finger has performed touching (FIG. 9F).

Next, upon the user moving the index finger, middle finger, and ring finger from the edge of the portable terminal 1 toward the center thereof (FIG. 9C), the IC 18 detects a touch from these fingers (FIG. 9G). Subsequently, upon the user releasing these fingers from the touch panel unit 30 (FIG. 9D), the IC 18 detects that these fingers have been released (FIG. 9H). At this time, the IC 18 detects that the center of gravity of the detection range has moved from the center direction of the touch panel unit 30 to the outer side. In such a case the IC 18 determines that the action of the user is an unintended operation.

[Third Example of Touching Action]

Figures 10A, 10B, 10C, 10D:
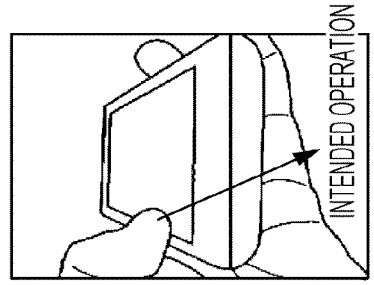
FIGS. 10A-10H are descriptive diagrams illustrating a third example of a touch operation of a portable terminal, according to an embodiment of the present disclosure.
Figures 10E, 10F, 10G, 10H:
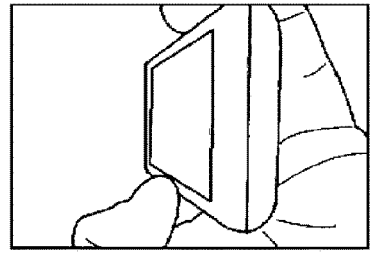

FIG. 10 is a descriptive diagram showing a third example of a touching action of the portable terminal 1. FIG. 10A through FIG. 10D show an example of the user placing the portable terminal 1 on the palm of the hand and operating with the thumb, and FIG. 10E through FIG. 10H show the ranges that the IC 18 detects according to the actions shown in FIG. 10A through FIG. 10D.

When the user has placed the portable terminal 1 on the palm of the hand and is not touching anywhere on the touch panel unit 30 (FIG. 10A), the IC 18 does not detect the fingers of the user (FIG. 10E). Next, even if the user brings the thumb close to the edge of the touch panel unit 30 (FIG. 10B), the IC 18 does not detect the fingers of the user (FIG. 10F).

Next, if the user touches the touch panel unit 30 with the tip of the thumb while moving orthogonally as to the surface (FIG. 10C), the IC 18 detects that the tip of the thumb has touched (FIG. 10G). Now, a cross-mark showing the center of gravity of the detection range will be shown to facilitate description.

When the user presses the ball of the thumb onto the touch panel unit 30 (FIG. 10D), the IC 18 detects that the touch area of the thumb has become greater. At this time, the IC 18 detects that the center of gravity of the detection range has not moved. In such a case the IC 18 determines that the action of the user is an intended operation.

[Fourth Example of Touching Action]

FIG. 11 is a descriptive diagram showing a fourth example of a touching action of the portable terminal. FIG. 11A through FIG. 11D show an example of the user placing the portable terminal 1 on the palm of the hand and operating with the thumb, and FIG. 11E through FIG. 11H show the ranges that the IC 18 detects according to the actions shown in FIG. 11A through FIG. 11D.

First, an example of an intended operation will be described.

Upon the user placing the portable terminal 1 on the left hand and touching the touch panel unit 30 with the index finger of the right hand (FIG. 11A), the IC 18 detects the center of gravity of the touch range of the index finger (FIG. 11E), and determines this to be an intended operation. In the case also that the user traces the surface of the touch panel unit 30 with the thumb of the left hand (FIG. 11B), the IC 18 detects the center of gravity of the touch range of the thumb (FIG. 11F), and determines this to be an intended operation.

Next, while an intended operation, an example of an operation to be ignored due to an operating miss or the like will be described.

Upon the user placing the portable terminal 1 on the left hand and touching the edge of the touch panel unit 30 with the index finger of the right hand (FIG. 11C), the IC 18 detects the center of gravity of the touch range of the index finger (FIG. 11G). At this time, the center of gravity is on the outer side of the touch panel unit 30, whereby the IC 18 determines that this is an unintended operation. In the case also that the user traces the edge of the touch panel unit 30 with the thumb of the left hand (FIG. 11D), since the center of gravity is on the outer side of the touch panel unit 30, the IC 18 determines this to be an unintended operation (FIG. 11H).

FIG. 12 shows an example of an operation not intended by the user. FIG. 12A and FIG. 12B show an example of gripping the portable terminal 1 so that the tips of the fingers are touching the touch panel unit 30, and FIG. 12C and FIG. 12D show the range that the IC 18 detects from the actions shown in FIG. 12A and FIG. 12B.

Upon the user placing the portable terminal 1 on the left hand and touching the edge of the touch panel unit 30 with the index finger, middle finger, ring finger, and little finger of the left hand (FIG. 12A), the IC 18 detects that the center of gravity in the touching range of these fingers are outside of the touch panel unit 30 (FIG. 12C), and determines this to be an unintended operation. Also, upon these fingers touching in the vicinity of the center of the touch panel unit 30 and the base of the finger touches the edge of the touch panel unit 30 (FIG. 12B), the center of gravity of the touching range of the fingers detected by the touch panel unit 30 is in the center of the touch panel unit 30 (FIG. 12D). At this time, the IC 18 determines this to be an unintended operation.

Figure 14:
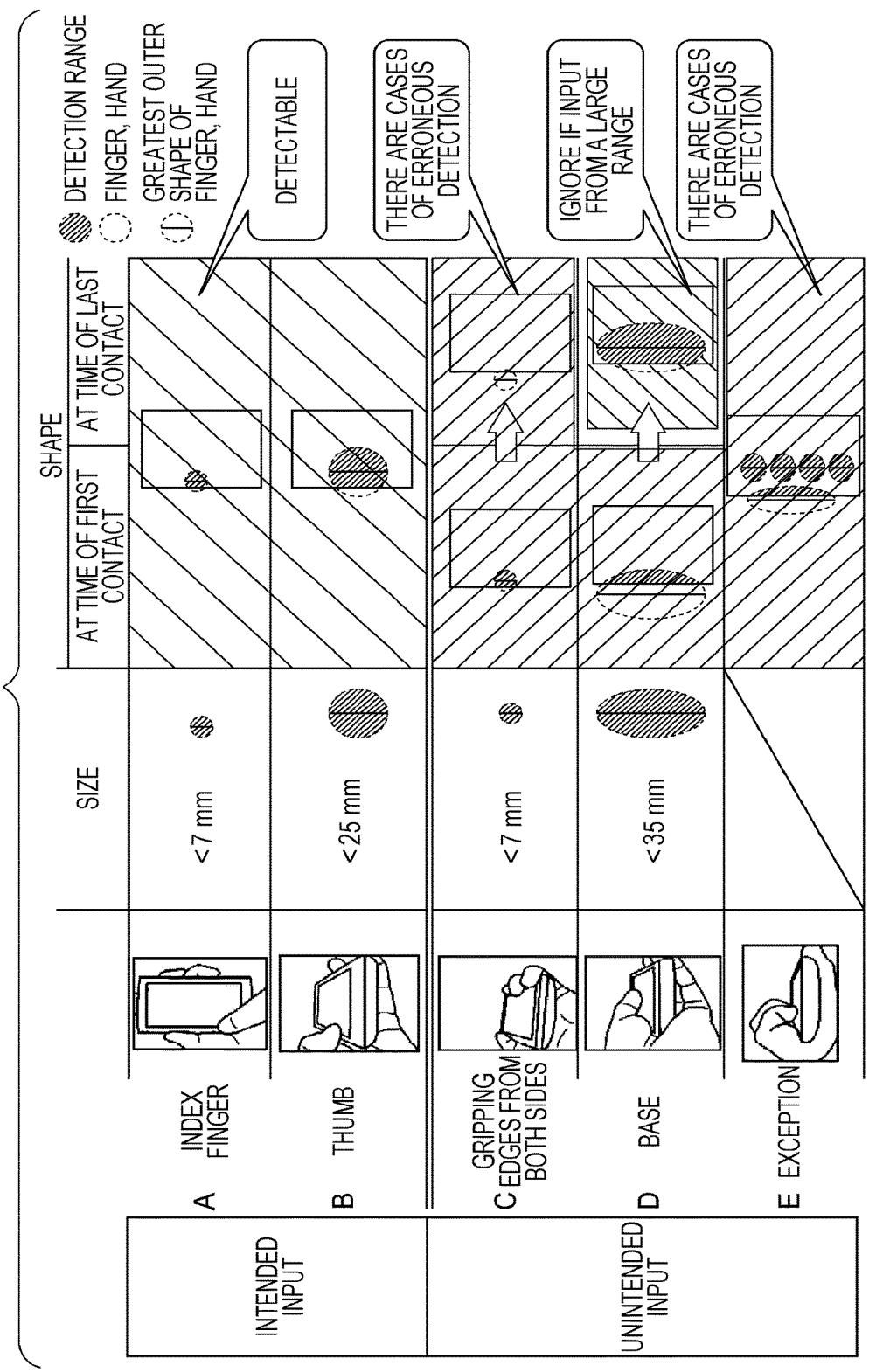
FIG. 14 is a chart showing an example of operations that conventionally have been detectable.
Figure 15:
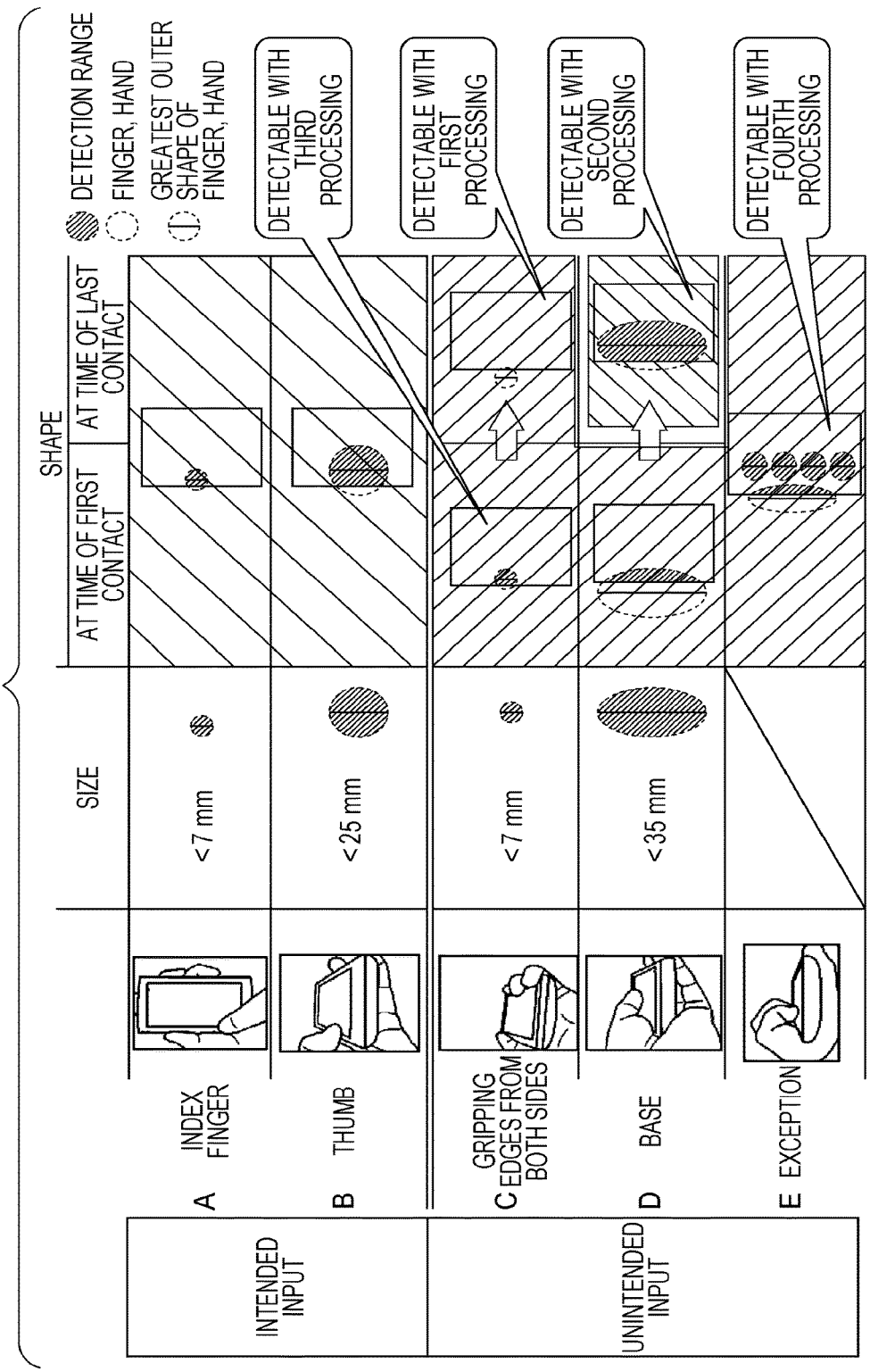
FIG. 15 is a chart showing an example of detection ranges according to an embodiment of the present disclosure.

Next, an example of the size and shape of various fingers of the user detected with the touch panel unit 30 will be described with reference to FIG. 13 through FIG. 15. In FIG. 13 through FIG. 15, the size of the object such as the finger of the user or the like is shown surrounded with a dotted line, the detection range where the IC 18 detects the object is shown as a portion having appending a shaded area within the dotted line, and the size of the maximum outer shape of the object such as finger of the user or the like is shown as an orthogonal line within the dotted line. Also, FIG. 13 and FIG. 14 both use the same chart to describe actions.

FIG. 13 is a chart showing an overview of detection processing of an object.

The vertical columns of FIG. 13 shows examples of an index finger of the user touching the portable terminal 1 (FIG. 13A), a thumb (FIG. 13B), gripping (FIG. 13C), base of a finger (FIG. 13D), and an irregular way of holding (FIG. 13E). Now, the index finger and thumb of the user as shown in FIG. 13A and FIG. 13B are exemplified as cases of performing intended operations, and the gripping, base of a finger, and irregular way of holding by the user, as shown in FIG. 13C through FIG. 13E are exemplified as cases of performing unintended operations.

Also, the horizontal rows of FIG. 13 show examples of the size and shape of each finger shown in the vertical columns of FIG. 13. Further, in the cells of the shapes, examples of the points wherein each finger first touches the touch panel unit 30 and of the points after touching for a predetermined amount of time having passed are shown.

Upon the index finger touching the touch panel unit 30, the size of the detection range is smaller than 7 mm. Also, in the case that the index finger points to the screen on the touch panel unit 30, the center of gravity of the detection range does not move on the touch panel unit 30. Therefore, the shape of the detection range continues to be maintained over a predetermined amount of time. Also, upon the thumb touching the touch panel unit 30, the size of the detection range is smaller than 25 mm and the center of gravity of the detection range is not moving on the touch panel unit 30, whereby the shape continues to be maintained over a predetermined amount of time.

On the other hand, if the portable terminal 1 is gripped, the size of the detection range is smaller than 7 mm, and the center of gravity of the detection range moves outward from within the touch panel unit 30. The detection range disappears at the point in time that the gripping fingers are released from the touch panel unit 30. Also, upon the base of the finger touching the touch panel unit 30, the size of the detection range is smaller than 35 mm, and the center of gravity of the detection range moves inward from the outside of the touch panel unit 30 and the detection range increases. Also, upon touching the touch panel unit 30 with an irregular way of holding, multiple detection ranges are detected, regardless of the size of detection range.

FIG. 14 is a chart showing examples of actions that have been detectable conventionally.

Conventionally, intentional operations with the index finger and thumb have been detectable (FIG. 14A, FIG. 14B). However, there has been the possibility that erroneous operations will be made with gripping, the base of the fingers, and an irregular way of holding (FIG. 14C, FIG. 14E). Also, upon the center of gravity of the base of the finger moving toward the center of the touch panel unit 30, the detection range becomes large, whereby the operation is set to be ignored (FIG. 14D).

FIG. 15 is a chart showing examples of detection ranges relating to an embodiment.

As described above, intentional operations with the index finger and thumb can be detected with methods used conventionally (FIG. 15A, FIG. 15B). Also, gripping can be detected with the first and third detection processing (FIG. 15C), the base of the finger can be detected with the second detection processing (FIG. 15D), and an irregular way of holding can be detected with the fourth detection processing (FIG. 15E).

Next, examples of the first through fourth processing to detect the size and shape of objects such as a finger that touches the touch panel unit 30 will be described.

[First Detection Processing: Example of Processing to Detect the Shape of an Object]

Figures 16A, 16B:
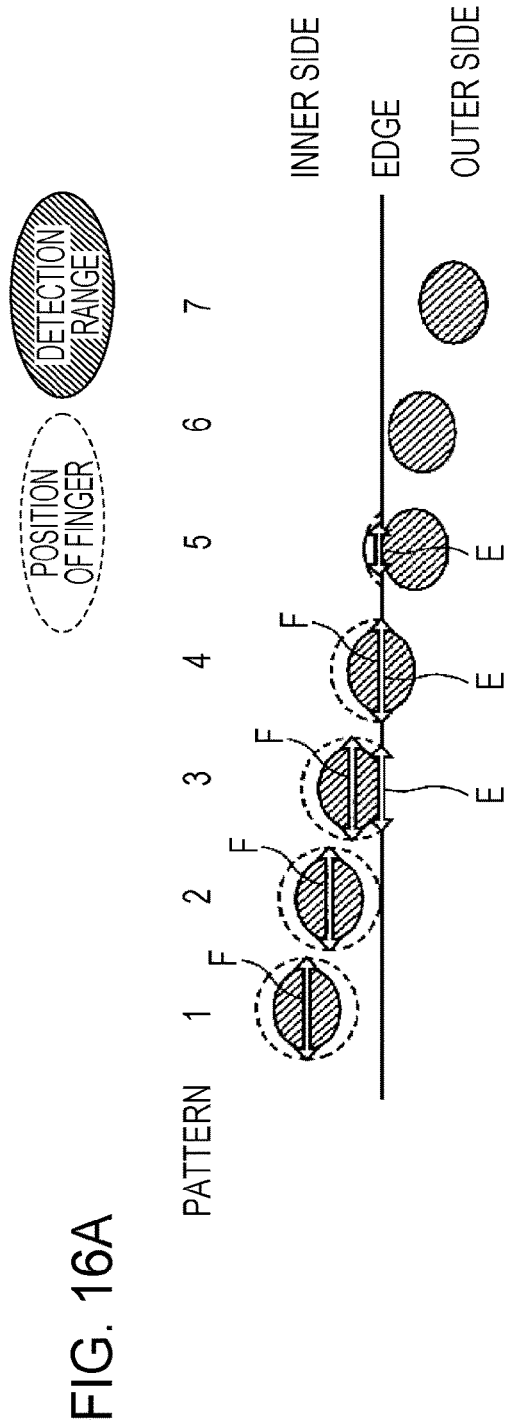
FIGS. 16A and 16B are descriptive diagrams illustrating an example of detecting the shape of an object such as a finger, according to an embodiment of the present disclosure.

FIG. 16 is a descriptive diagram showing an example of detecting the shape of an object such as a finger. FIG. 16A shows the shape of the finger touching the touch panel unit 30, and FIG. 16B shows an example of information of the shape of the finger that the touch panel unit 30 has detected.

FIG. 16A shows the inner side of the touch panel unit 30 where the IC 18 detects the touch of an object, the space outside the touch panel unit 30, and the edge of the touch panel unit 30. The position of the finger that the IC 18 detects is shown as a first pattern and the state of dragging the finger to the outer side of the touch panel unit 30 is shown with second through seventh patterns. Here, the detection range that the IC 18 detects is a large oval shape corresponding to the size of the finger touching the touch panel unit 30. Therefore, the long side of the detection range that is parallel to the edge of the touch panel unit 30 is denoted as "width F".

Upon the finger moving from the inner side of the touch panel unit 30 to the outer side, a portion of the detection range becomes missing due to the edge of the touch panel unit 30. The length of the portion where the oval shape showing the detection range and the edge of the touch panel unit 30 intersect is denoted as "width E". Width E becomes longer when the finger is resting on the edge of the touch panel unit 30, and becomes shorter when the finger is released from the touch panel unit 30.

In the first detection processing, the IC 18 determines whether the input operation of the object approaching the edge of the touch panel unit 30 is valid or invalid based on the width changes to the object. Now, the ID 18 compares the width F and the width E when the finger crosses over the edge of the touch panel unit 30, and determines whether the touch input of the object is an operation intended by the user according to the conditions below.

(1) In the case of width F>width E, determines that an input operation has been made, and connects to following processing.

(2) In the case of width F≤width E, determines the operation to be in error, and does not connect to following processing.

FIG. 16B shows an example of widths E and F in the first through seventh patterns. The IC 18 determines that with the first through third patterns, the operation is intended by the user. On the other hand, with the fourth through seventh patterns, even if widths E and F are detected, determination is made that the operation is not intended by the user.

Figure 17A:
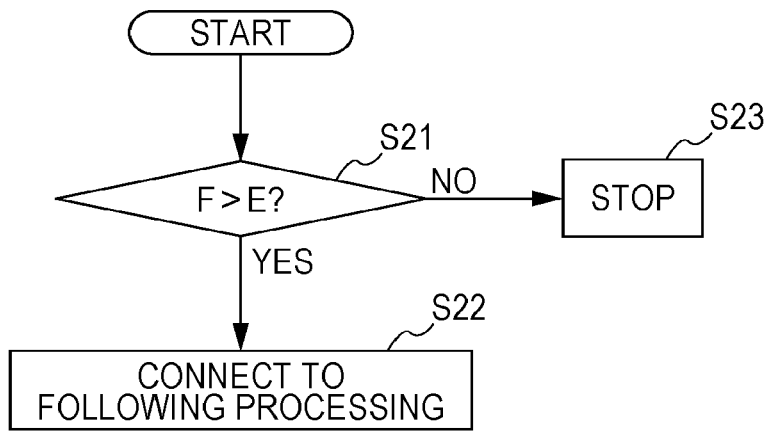
FIGS. 17A and 17B are flowcharts showing an example of two determination processes for the touch panel to detect the shape of an object, according to an embodiment of the present disclosure.
Figure 17B:
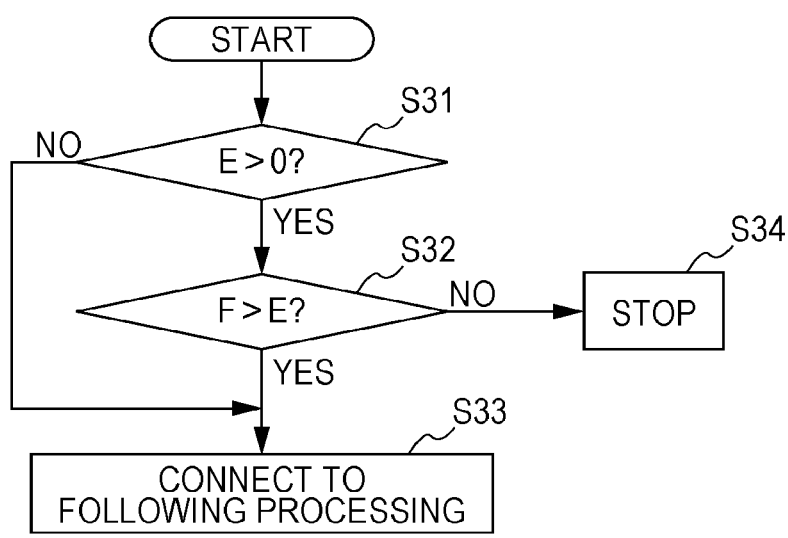

FIG. 17 is a flowchart showing an example of two determining processing for the IC 18 to detect the shape of an object. FIG. 17A shows an example of a first determining processing, and FIG. 17B shows an example of a second determining processing.

In the example of the first determining processing shown in FIG. 17A, the IC 18 determines whether the input operation of the object is valid or invalid in the case that the width of the object approaching the touch panel unit 30 in the direction roughly parallel to the edge of the touch panel unit 30 is wider than the width of the object crossing over the edge of the touch panel unit 30.

First, the IC 18 compares the width F that has approached the touch panel unit 30 and the width E when the finger crosses over the edge of the touch panel unit 30 (step S21). In the case of width F>width E, connection is made to the following processing (step S22), and in the case of width F≤width E, the processing is stopped (step S23). In the description below, "following processing" indicates processing such as an application program or the like performed with the control unit 3, for example.

In the example of the second determining processing shown in FIG. 17B, in the case that the width of the object crossing over the edge of the touch panel unit 30 is greater than 0, the IC 18 performs a comparison between the width of the object approaching the touching panel unit 30 in the direction roughly parallel to the edge of the touch panel unit 30 and the width of the object crossing over the edge of the touch panel unit 30.

First, the IC 18 determines whether the width E when the finger crosses over the edge of the touch panel unit 30 is greater than 0 (step S31). In the case that width E is greater than 0, connection is made to the following processing (step S33).

Next, the approached width F and the width E when the finger crossing over the edge of the touch panel unit 30 is compared (step S32). In the case of width F>width E, connection is made to the following processing (step S33), and in the case that width F≤width E, the processing is stopped (step S34).

FIG. 18 is a descriptive diagram showing a situation wherein detection processing of the shape of an object is performed in the event that the user is holding the portable terminal 1.

First, when the user sets the portable terminal 1 on the left hand and touches the vicinity of the center of the touch panel unit 30 with the thumb, the relation between detected widths F and E are width F>width E or width E=0 (FIG. 18A). Therefore, the operation with the thumb is accepted.

Next, the user releases the finger from the center of the touch panel unit 30 and places multiple fingers on the edge of the touch panel unit 30 (FIG. 18B). At this time, since width F≤width E, the operation with the fingers on the edge is not accepted.

Next, the user places a finger at the center and on the edge of the touch panel unit 30 (FIG. 18C). At this time, width F>width E and width E=0 holds for the thumb that has touched near the center of the touch panel unit 30, and width F≤width E holds for the finger placed on the edge of the touch panel unit 30, whereby only the operation of the thumb is accepted.

Further, the base of the thumb touches the edge of the touch panel unit 30 (FIG. 18D). At this time, width F≤width E holds, whereby the operation is not accepted.

Note that various mechanisms of the touch panel unit 30 that detects the shape of the object crossing over the edge can be conceived. Here, the types of mechanisms for the touch panel unit 30 will be described.

FIG. 19 shows an example of the mechanism of various types of the touch panel unit 30.

FIG. 19A shows an example of a touch panel unit 30 that is larger than the display 14.

Now, the vertical and horizontal lengths of the touch panel unit 30 are larger than the vertical and horizontal lengths of the display 14. Therefore, an object crossing over the edge can be detected by embedding a touch sensor in the edge of the touch panel unit 30 that sticks out from the display 14.

FIG. 19B shows an example wherein the display 14 and a touch panel unit 30' are roughly the same size.

The display 14 and the touch panel unit 30' are roughly the same size, but a sensor detects the length that an object crosses over the location of the width of one pixel on the outer side of the edge of the display 14. By thus configuring, the size of the touch panel unit 30' can be suppressed, and the entire portable terminal 1 can be miniaturized.

As shown in FIG. 19A and FIG. 19B, the touch panel unit 30 is formed larger than the display unit that displays the information. Therefore, the IC 18 finds the width of an object which nears the edge of the touch panel unit 30 which is a portion larger than the display unit of the touch panel unit 30.

FIG. 19C shows an example of an electroconductive layer (later-described electroconductive printed pattern 33) used as an electrode sensor that is attached to the edge of the touch panel unit 41.

The size of the display 14 and the touch panel unit 41 are the same, but multiple electroconductive layers are attached to the periphery of the touch panel unit 41. Now, a detailed configuration example of the touch panel unit 41 shown in FIG. 19C will be described with reference to FIG. 20 and FIG. 21. Note that the touch panel unit 41 has similar configurations as the above-described touch panel unit 30, so for such configurations the same reference numerals will be appended, and detailed description will be omitted.

Figure 20A:
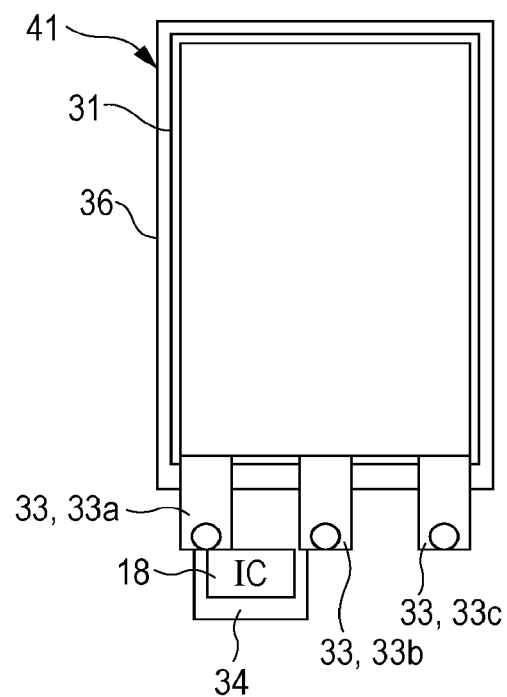
FIGS. 20A and 20B are diagrams illustrating a schematic configuration of a capacitance-type touch panel wherein an electroconductive printed pattern has been capacitance-coupled, according to an embodiment of the present disclosure.
Figure 20B:
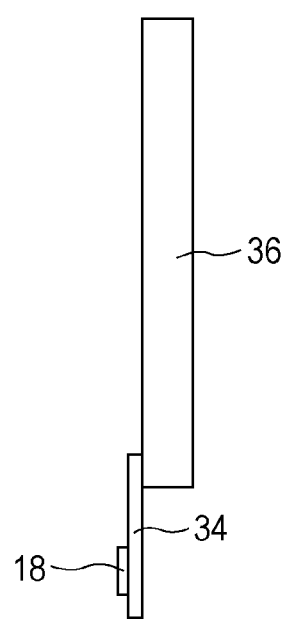
Figure 21:
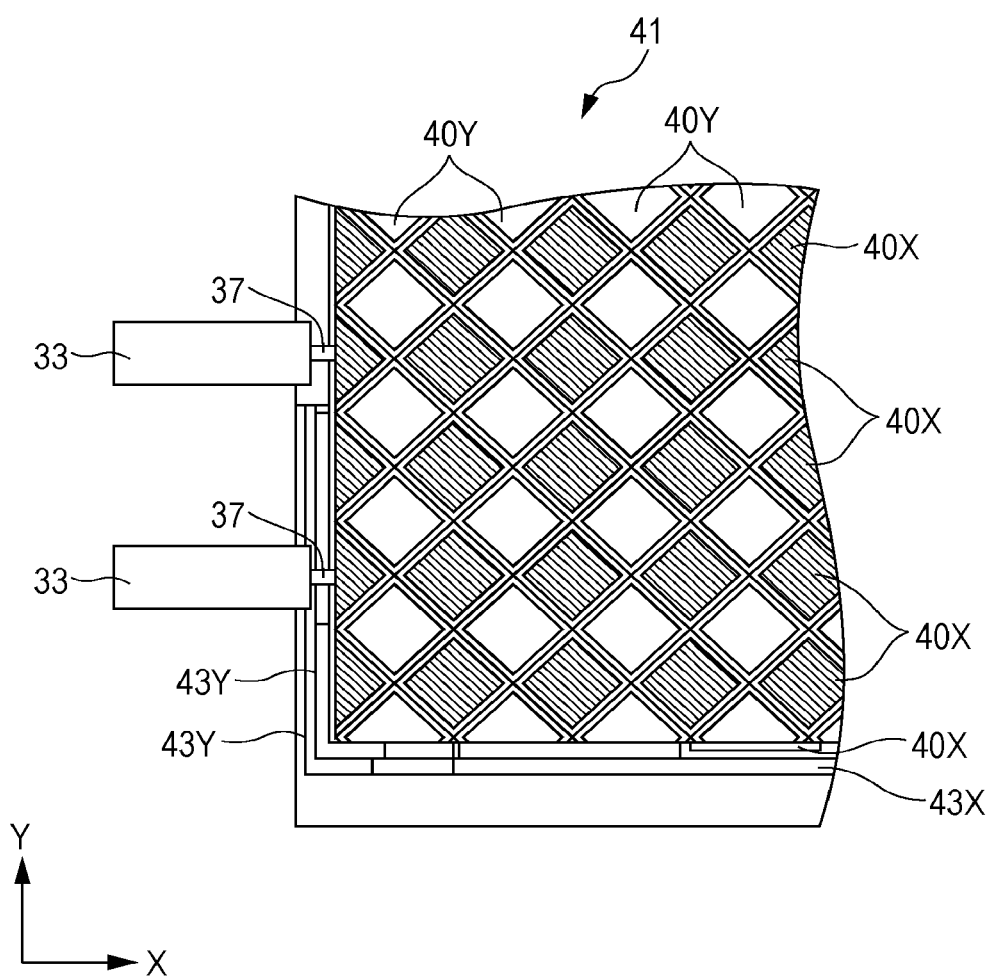
FIG. 21 is a diagram schematically showing, in an enlarged manner, the vicinity of a rectangular transparent electrode unit of a capacitance-type touch panel and an electroconductive printed pattern which has been capacitance-coupled therewith, according to an embodiment of the present disclosure.

FIG. 20 shows a schematic configuration of the touch panel unit 41. Note that FIG. 20A shows a diagram viewing the touch panel unit 41 from the front, and FIG. 20B shows a diagram viewing the touch panel unit 41 from the side. Also, FIG. 21 shows a portion of the touch panel unit 41 in an expanded manner. Note that the touch panel unit 41 shown in FIG. 20 and FIG. 21 is an example having an electroconductive printed pattern 33 (33a, 33b, 33c) serving as an electroconductive layer that is capacitively coupled to a transparent electrode unit in one direction, but an electroconductive printed pattern 33 may be provided in multiple directions as shown in FIG. 19C.

The electroconductive printed pattern 33 is a thin electroconductive print layer formed with screen printing or the like on a window glass plate or flexible print substrate or the like, for example. The electroconductive printed pattern 33 is connected to a transparent electrode unit, and is configured so as to extend from the array area of the rectangular transparent electrode units 40X and 40Y toward the outer side. The electroconductive printed pattern 33 is capacitively coupled between the rectangular transparent electrode units 40X of the outermost edge of the rectangular transparent electrode units 40X, or between the rectangular transparent electrode units 40Y of the outermost edge of the rectangular transparent electrode units 40Y. Note that for the diagram to be easily readable, the size on the diagram of the electroconductive printed pattern 33 is drawn smaller than the size on the diagram of the various rectangular transparent electrode units 40X and the various rectangular transparent electrode units 40Y. However, the actual size of the electroconductive printed pattern 33 is greater than the various rectangular transparent electrode units 40X and 40Y.

With the touch panel unit 41, the electroconductive printed pattern 33 is disposed so as to be extended to the outer side of the X-Y transparent electrode pattern unit 31 in a direction roughly parallel to the plane of the X-Y transparent electrode pattern unit 31. However, the electroconductive printed pattern 33 may be disposed so as to be extended to the outer side of the X-Y transparent electrode pattern unit 31 while being bent in a square direction as to the plane of the X-Y transparent electrode pattern unit 31 or another desired angle direction, or may be disposed so as to be extended in a curved form. Further, an assistant wiring pattern 37 may also be formed between the electroconductive printed pattern 33 and each of the rectangular electrode units 40X on the outer edge portion or the rectangular electrode units 40Y on the outer edge portion to assist the capacitive coupling therebetween.

Also, when a touch is made by an object as to the electroconductive printed pattern 33, the IC 18 can detect the width of an object approaching the edge of the touch panel unit 30 via the rectangular transparent electrode unit which is capacitively coupled to the electroconductive printed pattern 33. In other words, with the touch panel unit 41, the detection area of the X-Y transparent electrode pattern unit 31 is expanded by the electroconductive printed pattern 33.

[Second Detection Processing: Example of Processing to Detect Size and Shape of Object]

FIG. 22 is a descriptive diagram showing an example of detecting the size and shape of an object such as a finger.

FIG. 22 shows examples of the size and shape of objects that touch the touch panel unit 30 in first through ninth patterns, in a list. This chart shows examples of a stylus pen (first pattern), index finger of an infant (second pattern), touching tip of index finger (third pattern), touching ball of index finger (fourth pattern), thumb (fifth pattern), and large thumb (sixth pattern). Also, the palm of a hand that touches the edge of the touch panel unit 30 (seventh pattern), a thumb that grips the portable terminal 1 (eighth pattern), and fingers other than the thumb that grip the portable terminal 1 (ninth pattern). Objects shown in the first through sixth patterns are considered to be performing operations intended by the user, and objects shown in the seventh through ninth patterns are considered to be causes of operations not intended by the user.

In the second detection processing, the IC 18 determines whether the input operation of the object is valid or invalid in the case that the widths in the X-direction and Y-direction of the object approaching the touch panel unit 30 exceed a first predetermined value and the ratio of the X and Y directions of the object exceeds a second predetermined value.

Therefore, the IC 18 measures the widths in the X-direction and Y-direction of the object touching the surface. Note that the short direction of the housing of the portable terminal 1 is defined as the X-direction and the long direction as the Y-direction. The shapes of the fingers and so forth in the first through sixth patterns are contained within a range of a width of 1 to 20 mm in the X-direction and a width of 1 to 25 mm in the Y-direction. Now, the ratio of the width in the X-direction as to the width in the Y-direction is contained within a range of 0.42 to 1.25.

On the other hand, the shapes of the fingers and so forth in the seventh through ninth patterns are contained within a range of a width of 3.5 to 10 mm in the X-direction and a width of 7 to 35 mm in the Y-direction. Now, the ratio of the width in the X-direction as to the width in the Y-direction is contained within a range of 2 to 7. These calculation results show that the ratios of the width in the X-direction as to the width in the Y-direction for the objects shown in the first through sixth patterns and for the objects shown in the seventh through ninth patterns are clearly different.

Therefore, in the case that the shape of the touched object has satisfied both of the two conditions below, the IC 18 determines whether the input operation is an intended operation.

(1) Width of object in X-direction>25 mm, or width in Y-direction>25 mm (first predetermined value condition)

(2) Width of object in Y-direction/width of object in X-direction>1.25 (second predetermined value condition)

Figure 23:
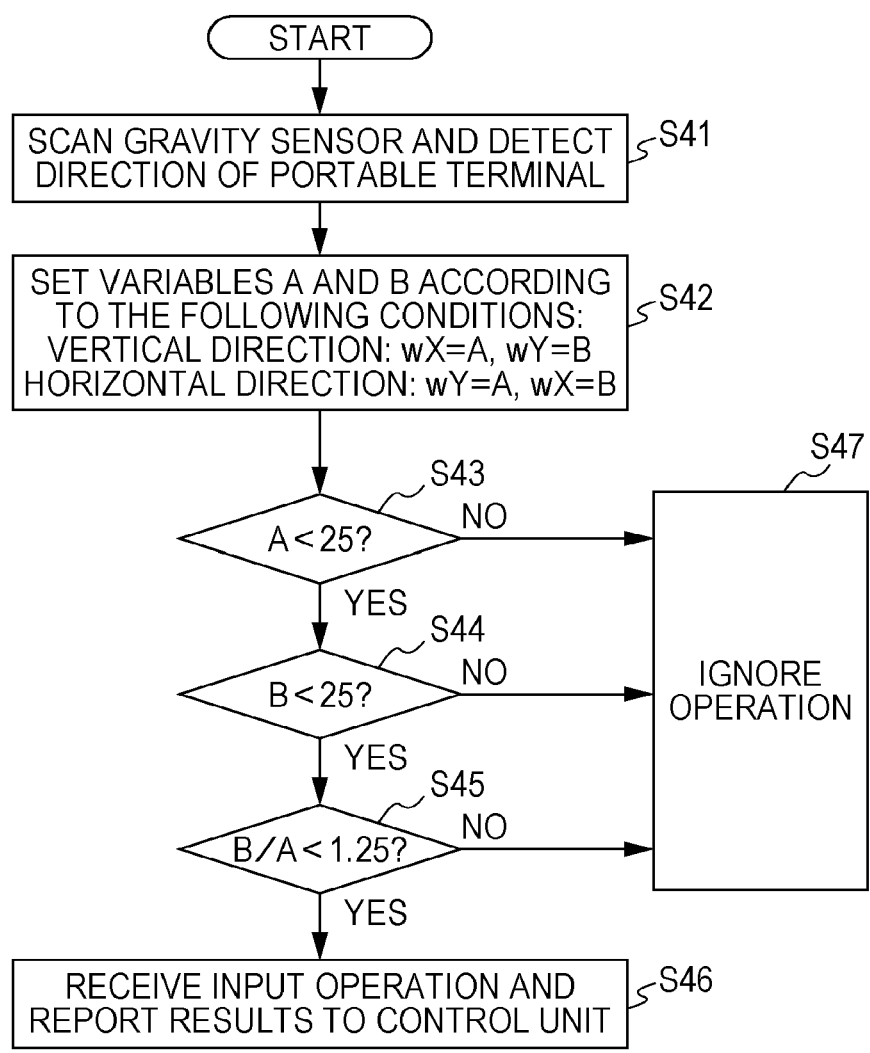
FIG. 23 is a flowchart showing an example of processing for the touch panel to detect the size and shape of an object, according to an embodiment of the present disclosure.

FIG. 23 shows an example of processing for the IC 18 to detect the size and shape of an object.

First, the IC 18 detects the direction of the portable terminal 1 which the user is holding as to the direction of gravity with an unshown gravity sensor (step S41). Next, variables A and B are set (step S42). Now, the length on the long edge of the portable terminal 1 is defined as wX, and the length of the short edge as wY. In the case that the direction of the long edge of the portable terminal 1 is roughly parallel to the direction of gravity, settings are made so that wX=A and wY=B. On the other hand, in the case that the direction of the long edge of the portable terminal 1 is roughly orthogonal to the direction of gravity, settings are made so that wX=B and wY=A.

Next, the IC 18 determines whether variable A<25 mm (step S43). If variable A≥25 mm holds, the operation is ignored (step S47), and if variable A<25 mm holds, determination is made as to whether variable B<25 mm (step S44). If variable B≥25 mm holds, the operation is ignored (step S47), and if variable B<25 mm holds, the IC 18 determines whether variable B/A<1.25 holds (step S45).

If variable B/A≥25 mm holds, the IC 18 ignores the operation (step S47), and if variable B/A<1.25 holds, the operation input is accepted and the results notified to the control unit 3 (step S46).

[Third Detection Processing: Example of Processing to Measure Object Touches Multiple Times and Detect Movement of Object Center of Gravity]

Figure 24:
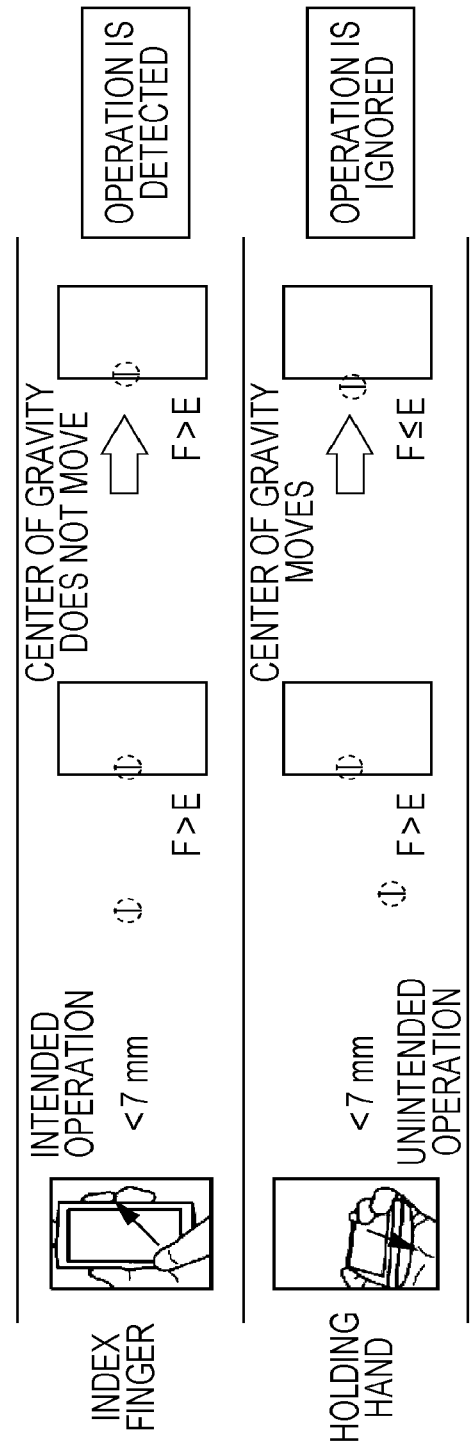
FIG. 24 is a descriptive diagram showing an example of the touch panel detecting movement of the center of gravity of an object, according to an embodiment of the present disclosure.

FIG. 24 is a descriptive diagram showing an example of the IC 18 detecting the movement of the center of gravity of an object.

FIG. 24 shows an example of the center of gravity of an index finger touching the touch panel unit 30 and of a hand that is holding when gripping the portable terminal 1, in a list.

The size of an index finger touching the touch panel unit 30 is less than 7 mm. Now, upon the index finger touching a portion of the touch panel unit 30, the IC 18 performs a first center of gravity detection. At this time, the width E that crosses over the edge of the touch panel unit 30 is smaller than the detected width F. After a predetermined amount of time has passed, the IC 18 performs a second center of gravity detection. At this time, the width E that crosses over the edge of the touch panel unit 30 continues to be smaller than the detected width F, and is detected as a valid operation if the center of gravity is not moving.

On the other hand, let us assume that the size of the holding hand touching the touch panel unit 30 is less than 7 mm. Now, when the holding hand touches a portion of the touch panel unit 30, the first center of gravity detection is performed. At this time, the width E that crosses over the edge of the touch panel unit 30 is smaller than the detected width F. After a predetermined amount of time has passed, the second center of gravity detection is performed. At this time, the holding hand is a portion that the user does not use to input operations, so often the holding hand is separated from the touch panel unit 30. Therefore, there are cases wherein with the second center of gravity detection, the center of gravity of the holding hand moves and so cannot be detected. Processing is performed to ignore such an operation as an erroneous operation by the user.

In the third detection processing, the IC 18 determines whether the input operation of the object is valid or invalid in the case that the width of the object approaching the touch panel unit 30 in a direction roughly parallel to the edge of the touch panel unit 30 measured over several times is greater than the width of the object crossing over the edge of the touch panel unit 30, and the output distribution hardly moves within the predetermined amount of time.

Thus the IC 18 twice compares the length of width F and of width E of the object crossing over the edge of the portable terminal 1, and determines the coordination to the following processing, according to the conditions below.

(1) In the case of width F>width E, detects an operation, and connects to following processing.

(2) In the case of width F≤width E, ignores the operation, and does not connect to following processing.

Figure 25A:
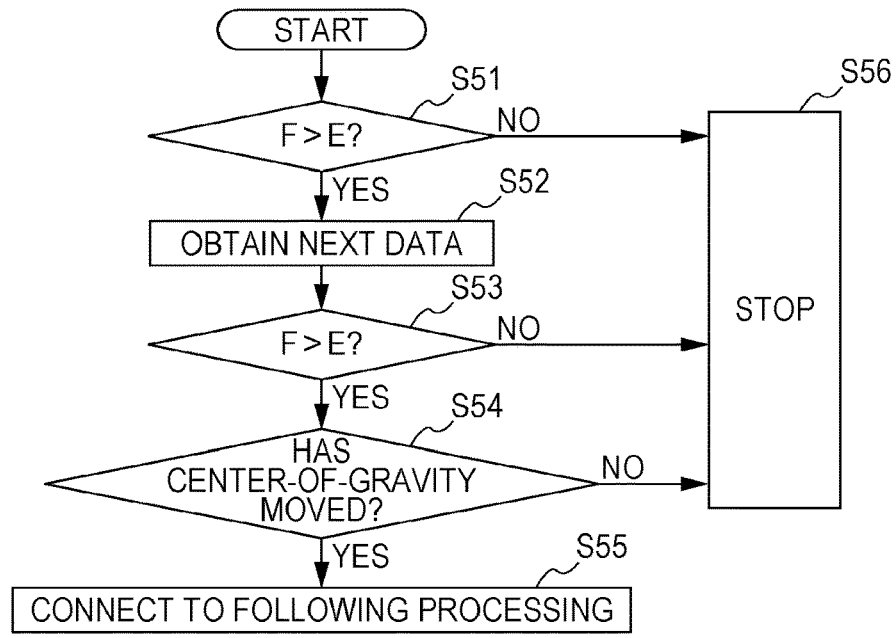
FIGS. 25A and 25B are flowcharts showing two determining processing examples to detect movement of the center of gravity of an object, according to an embodiment of the present disclosure.
Figure 25B:
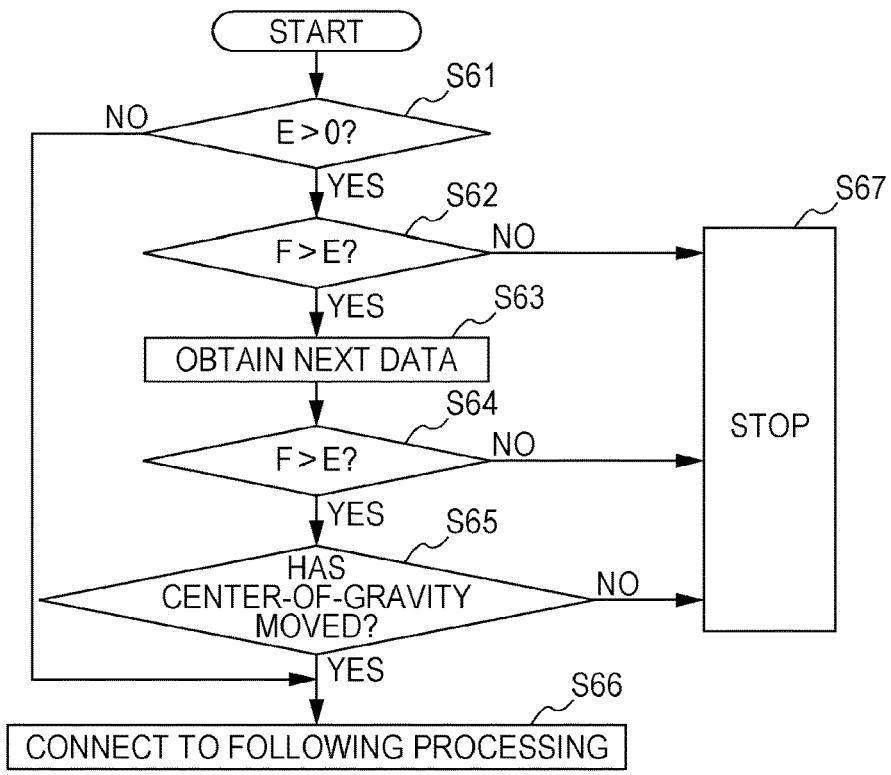

FIG. 25 is a flowchart showing the example of two determining processes to detect the movement of center of gravity of the object. FIG. 25A shows an example of a first determining processing and FIG. 25B shows an example of a second determining processing.

In the example of the first determining processing shown in FIG. 25A, first, the IC 18 determines whether width F>width E holds (step S51). If width F≤width E holds, the processing is stopped (step S56), and if width F>width E holds, the data for the next step is obtained (step S52).

Next, determination is made again as to whether width F>width E holds (step S53). If width F≤width E holds, the processing is stopped (step S56), and if width F>width E holds, determination is made as to whether the center of gravity of the object has moved (step S54). If the center of gravity has moved the processing is stopped (step S56), and if the center of gravity has not moved, connection is made to the following processing (step S55).

In the example of the second determining processing shown in FIG. 25B, in the case that the width of the object crossing over the edge of the touch panel unit 30 is greater than 0, the IC 18 performs a comparison with the width of the object approaching the touch panel unit 30 in a direction roughly parallel to the edge of the touch panel unit 30, and determines whether the input operation of the object is valid or invalid.

First, the IC 18 determines whether width E>0 holds (step S61). If width E≤0 holds, the following processing is performed (step S61), and if width E>0 holds, the following steps are performed. Now, the processing in steps S62 through S67 from the next step on is the same as the processing in steps S51 through S56 shown in FIG. 25A, so the detailed description will be omitted.

[Fourth Detection Processing: Example of Processing to Detect Touch Pattern of Object]

Figure 26A:
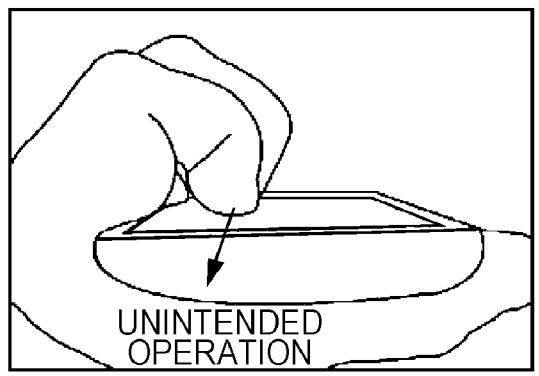
FIGS. 26A and 26B are descriptive diagrams showing an example of processing to detect a touch pattern of an object, according to an embodiment of the present disclosure.
Figure 26B:
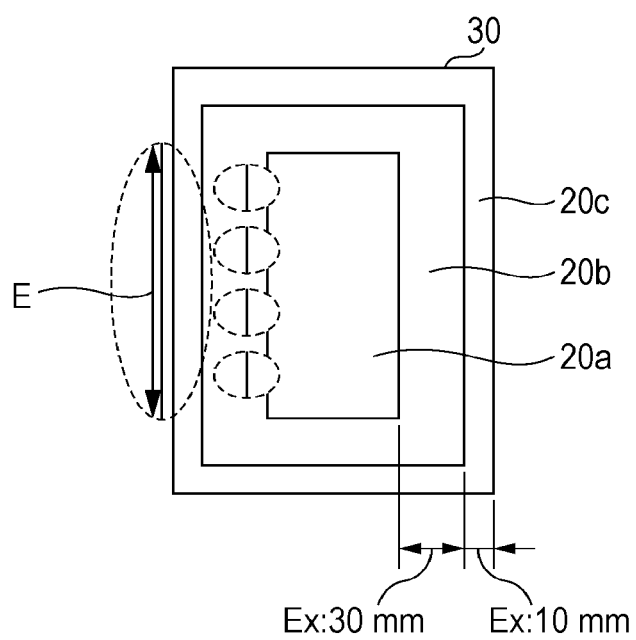

FIG. 26 is a descriptive diagram showing an example of processing to detect the touch pattern of an object. FIG. 26A shows an example of gripping while leaving a space between the edge of the touch panel unit 30 and the surface. FIG. 26B shows an example of three types of detection regions of the touch panel unit 30.

Upon the user gripping the portable terminal 1 that has been placed on the base of the thumb, a space is created between the edge of the portable terminal 1 and the fingers other than the thumb that touch the touch panel unit 30 (FIG. 26A). Such touching is not intended by the user, so it is desirable for this to be determined as operation inputs not having been made.

In the Fourth detection processing, the IC 18 defines at least two detection ranges that have a predetermined width on the inner side of the edge of the touch panel unit 30. Whether the input operation of the object is valid or invalid is determined in the case that, of the objects approaching a first detection range defined at the outermost side and a second detection range defined on the inner side of the first detection range, the width of the object approaching within the first detection range in a direction roughly parallel to the edge of the touch panel 30 is smaller than a predetermined value.

Now, first detection region 20a through third detection region 20c having rectangular shapes of different sizes in order to detect objects touching the touch panel unit 30 are provided. The first detection region 20a through third detection region 20c are, in order from the center of the touch panel unit 30, a first detection region 20a, second detection region 20b, and third detection region 20c. Note that the third detection region 20c is a region that is 10 mm to the inner side from the edge of the touch panel unit 30, the second detection region 20b is a region that is 30 mm to the inner side of the third detection region 20c, and the first detection region 20a is a region on the inner side of the second detection region 20b. The IC 18 detects a touching pattern of the object from the size of the object touching the various detection regions and the length crossing over the borders with the other regions.

Figure 27:
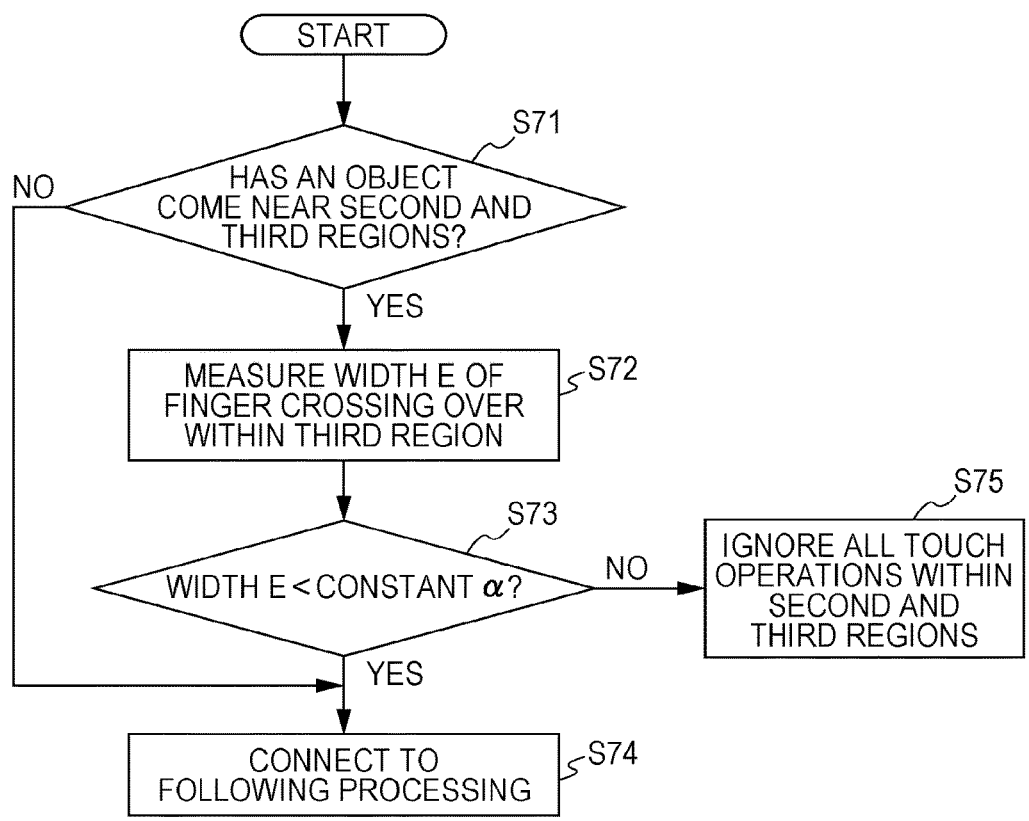
FIG. 27 is a flowchart showing an example of processing to detect a touch pattern of an object, according to an embodiment of the present disclosure.

FIG. 27 is a flowchart showing an example of processing to detect the touching pattern of the object.

First, the IC 18 determines whether the object has touched the second detection region 20b and third detection region 20c (step S71), and if no object is touching, connects to the following processing (step S75).

If an object is touching, the IC 18 detects all of the objects touching the second detection region 20b and third detection region 20c (step S72). At this time, the width E of the object touching the third detection region 20c crossing over the edge of the touch panel 30 is measured (step S73).

Determination is then made as to whether width E<constant α holds (step S74). Now, the constant α is a fixed value that is stored in the memory 8 for comparison to the width E. With the present embodiment, the constant α is set as 35 mm, but the value of the constant α can be changed appropriately.

If width E≥constant α holds, all of the touching inputs of the object that touch the second detection region 20*b* and third detection region 20*c* are ignored (step S76). On the other hand, if width E<constant α holds, connection is made to the following processing (step S75).

According to the touch panel device 20 relating to an embodiment described above, the shape and size and so forth of the object such as a finger touching the edge of the touch panel unit 20 is detected, and determination is made as to whether or not the operation is intended by the user, based on changes to the shape and so forth of the detected object. Therefore, operations such as gripping the portable terminal 1 are not accepted, and operations not intended by the user can be prevented.

Now, with the first detection processing, determination is made that the operation is intended in the case that the width of the object crossing over the edge of the touch panel unit 30 is greater than the width of the object on the touch panel unit 30. Therefore, erroneous operations from unintended operations where the finger of the holding hand has been placed on the edge of the touch panel unit 30 can be reduced.

Also, with the second detection processing, the widths in the X- and Y-directions of the object approaching the touch panel unit 30 are found, and determination is made that the operation is unintended in the case that the width in the X- or Y-direction is greater than the predetermined value, or in the case that the ratio of the widths in the X- and Y-directions are greater than the predetermined value. Therefore, the size and shape of the objects approaching the edge of the touch panel unit 30 are more accurately detected, and erroneous operations can be prevented.

Also, with the third detection processing, as a result of detecting multiple times the touch of the object approaching the touch panel unit 30, the movement of the center of gravity of the object is detected, whereby operation input by actions not intended such as the center of gravity of the object moving outside the touch panel unit 30 can be ignored.

Also, with the fourth detection processing, the touching pattern of the object approaching the touch panel unit 30 is found, and in the case of being other than predetermined patterns, the operation input is ignored. Therefore, unintended operations being performed when the user grips the portable terminal 1 can be prevented.

2. Modifications

Note that with the above-described embodiment, an example is described wherein hardware performs control so that the IC 18 provided to a touch panel device 20 calculates center of gravity position of the object, based on an output distribution of capacitance values, and determination is made as to whether the input operation of the object is valid or invalid, but the touch panel device 20 may be used just for detecting a touch. In this case, the IC 18 just outputs the capacitance values of the touch panel unit 30. The control unit 3 provided by the portable terminal 1 calculates the center of gravity position of the object at the position where the object is approaching the screen of the touch panel unit 30, based on the output distribution of the capacitance values, and determines from the center of gravity position of the object whether the input operation of the object is valid or invalid. Thus the processing accepted by the IC 18 is executed by the control unit 3 as processing on the OS, whereby similar advantages can be obtained as with the above-described embodiment.

[Modification of Processing to Find Center of Gravity Position]

Now, a method to calculate the threshold used to extract data for calculating the center of gravity position will be described. According to the present disclosure, the threshold can be changed according to information (parameters) obtained from the shape of the output distribution of capacitance values obtained with the touch panel scanning unit 19 (see FIG. 1).

The object of performing such control is to calculate the optimal center of gravity position regardless of the size of object that is near, and to accurately as possible find the position (coordinates) of the operation input by the user. By detecting the coordinates of the position that the object is approaching as the center of gravity position, precision in determining whether or not the input operation by the user is intended can be improved.

In order to do so, "data appropriate for calculating the center of gravity position" should be extracted, and calculations for the center of gravity position made using the values therein. The inventors of the present disclosure noticed that "data appropriate for calculating the center of gravity position" can be defined using features of the distribution shape of the capacitance values. A distribution shape that is easy to calculate center of gravity position is a shape satisfying the following two conditions.

(1) A shape that is close to a triangle
(2) The base having a certain width or greater The shape of (1) is obtained at a location where there is a peak in (near) the center thereof, and the differences in signal levels obtained between the electrodes are great. The "base" shown in (2) indicates the horizontal width of the location which is the same value as the threshold in a distribution shape of capacitance values. The optimal value of these values changes according to the disposal spacing (pitch) between the rectangular transparent electrode units 40X and the rectangular transparent electrode units 40Y (see FIG. 3). Specifically, in the case that the pitch between the various electrodes X-Y is 5 mm, if the width is set to 5 mm, we understand that the center of gravity can be optimally calculated. In the description below, this width is called "optimal threshold width".

In which of the distribution shapes of capacitance values actually detected the optimal distribution shape for calculating such a center of gravity position will appear changes depending on the size of the approaching object. In other words, the location where the "distribution shape optimal for calculating the center of gravity position" can be extracted can be identified based on information of the distribution shape of the capacitance values actually detected, which changes depending on the size of the object. By setting the threshold at the location thereof, data optimal for calculating the center of gravity position can be extracted.

Figure 28:
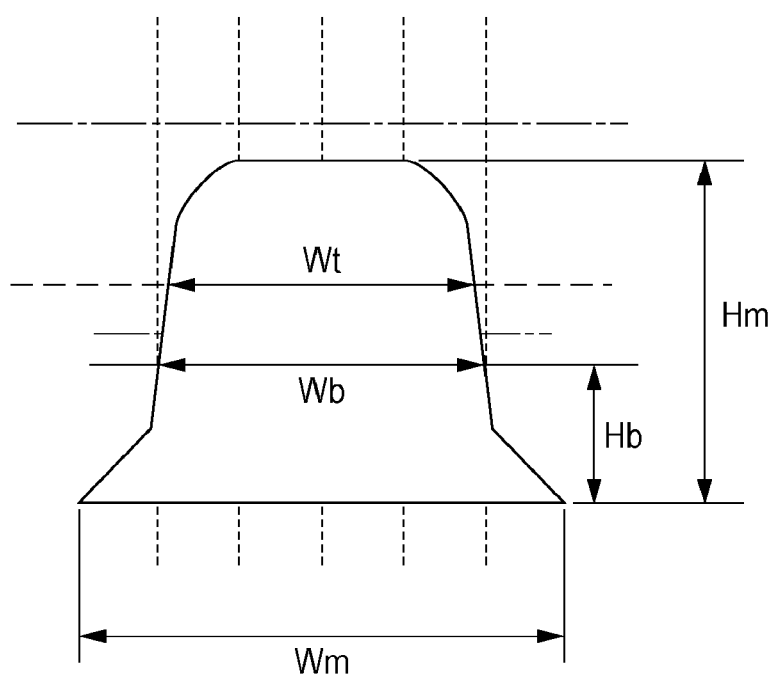
FIG. 28 is a descriptive diagram illustrating an example of various parameters configuring the distribution shape of capacitance values detected with the touch panel scanning unit, according to an embodiment of the present disclosure.

Of the information obtained from the distribution shapes of the capacitance values, FIG. 28 is a descriptive diagram showing information thought to contribute to the identification of "distribution shape optimal for calculating the center of gravity position". The horizontal axis in FIG. 28 shows the X-direction of the X-Y transparent electrode pattern unit 31 (see FIG. 2), and the vertical axis shows the size of the signal levels of the capacitance values detected. The distribution of the capacitance values shown in FIG. 28 is obtained when the object with a diameter of 7 mm, presumably an index finger, approaches.

A maximum height Hm indicates the height of a location where the capacitance values in the distribution shape is the highest, and of the capacitance values that change when an object nears, the width Wm of the base indicates the width in the X-direction (or Y direction) at a location where the signal level is lowest. The on-threshold width Wt indicates a horizontal width of a portion wherein the signal level thereof is the same value as a contact determining threshold Th1, and an optimal threshold width Wb indicates a width considered to be optimal as a horizontal width of the portion having the same value as a threshold Th2. An optimal threshold height Hb indicates a height from the base point wherein the signal level is lowest (the point wherein the width Wm on the base if formed) up to the optimal threshold width Wb.

As a specific method to extract the "distribution shape optimal for calculating the center of gravity position" using the various parameters, i.e. to perform optimization of the threshold Th2, the three methods below may be given.

(Method 1) Adjust the optimal threshold height Hb according to the size of the base width Wm.

(Method 2) Adjust the optimal threshold height Hb so that the optimal threshold width Wb (first width) is the same value as the width set with an index finger as a model (e.g., 5 mm), by integrating the capacitance values from the base.

(Method 3) Adjust the optimal threshold height Hb based on information of the curve angle in the distribution shape.

Note that the methods for performing optimization of the threshold Th2 are not limited to these, and other methods may be used as long as the method can extract the "distribution shape optimal for calculating the center of gravity position".

FIG. 29 is a descriptive diagram showing the detection width of objects in the X-direction (horizontal direction) and Y-direction (vertical direction) of the touch panel unit 30 and the relations of such types of objects.

Now, an example applying the Method 1 will be described, based on an example of a frequency distribution of a stylus pen, finger of a child, index finger of a normal size, thumb of a normal size, and large thumb as detected objects approaching the touch panel unit 30. The diameter of the stylus pen is smaller than 1 mm, and the diameter of the finger of a child is contained within a range of 3 to 7 mm. Also, the diameter of the index finger of a normal size is approximately 7 mm, the diameter of a thumb of normal size is approximately 20 mm, and the diameter of a large thumb is approximately 20 mm×30 mm.

Now, in the event of detecting an object, the optimal threshold width Wb is set as 5 mm as a general experimental value. Note that as to the base width Wm, a threshold may be provided a short distance from the surface of the touch panel unit 30 in order to remove influence such as noise that occurs near the surface of the touch panel unit 30, and the base of the detected distribution exceeding the threshold thereof may be set as a base width Wm.

As shown in FIG. 29, the detection distribution changes according to the size of various objects approaching the touch panel unit 30. The optimal threshold value Wb for calculating the center of gravity is moved up and down matching positions in the detection distribution that are 5 mm, to find the optimal threshold height Hb, and the center of gravity of objects in the optimal threshold value height Hb is calculated. Thus, the center of gravity position of an object can be found.

Note that the series of processing according to the above-described embodiment can be executed with a computer which has a program making up software that is built into dedicated hardware, or a computer that has a program for executing various types of functions installed therein.

Also, a storage medium having stored program code for the software to realize the functions of the above-described embodiment may be supplied to a system or device. Also, it goes without saying that the functions can be realized by a computer of such system or device (or control device such as CPU) reading out and executing the program code stored in the storage medium.

A storage medium used to supply a program code in this case may be, for example, a flexible disk, hard disk, optical disk, magneto-optical disk, CD-ROM, CD-R, magnetic tape, non-volatile memory card, ROM, and so forth.

Also, by executing the program code read out by the computer, the functions of the above-described embodiment are realized. Additionally, based on instruction by the program code thereof, a portion or all of the actual processing is performed by the OS or the like operating on the computer. Cases wherein the functions of the above-described embodiment are realized by the processing thereof are also included.

Also, it goes without saying that the present disclosure is not restricted to the above-described embodiment, and that other types of application examples and modifications can be made within the scope and essence of the Claims of the present disclosure. Accordingly, one skilled in the art will understand as a matter of course that various modifications, combinations, and other embodiments may be made from design or other elements, within the scope of the Claims or the equivalent of the Claims.

Note that the present disclosure can also assume configurations such as the following.

(1) A touch panel device comprising:
a touch panel that detects a touch input, the touch panel including a plurality of electrodes arrayed in X and Y directions; and
circuitry configured to
calculate a first width corresponding an object approaching the touch panel based on an output distribution of capacitance values from the touch panel; and
determine whether an input operation corresponding to the object is valid based on the calculated first width of the object.

(2) The touch panel device of (1), wherein
the circuitry is configured to detect a change in the calculated first width of the object based on an output distribution of capacitance values from the touch panel over a period of time.

(3) The touch panel device of (2), wherein
the circuitry is configured to determine whether an input operation corresponding to the object is valid based on the detected change in the first width of the object.

(4) The touch panel device of any of (1) to (3), wherein
the circuitry is configured to
calculate, as the first width corresponding to the object, a width of the object approaching an edge of the touch panel in a direction substantially parallel to the edge of the touch panel; and
calculate, as a second width corresponding to the object, a width of the object crossing over the edge of the touch panel based on an output distribution of capacitance values from the touch panel.

(5) The touch panel device of (4), wherein
the circuitry is configured to
compare the first width with the second width; and determine whether the input operation corresponding to the object if valid based on the comparison between the first and second widths.

(6) The touch panel device of (5), wherein
the circuitry is configured to
determine that the input operation is valid when the first width is greater than the second width; and
determine that the input operation is invalid when the first width is less than the second width.

(7) The touch panel device of any of (4) to (6), wherein
the circuitry is configured to
determine whether the second width is greater than zero; and
compare the first width with the second width, and determine whether the input operation corresponding to the object if valid based on the comparison between the first and second widths only when the second width is greater than zero.

(8) The touch panel device of (1), wherein
the circuitry is configured to
calculate, as the first width corresponding to the object, a width of the object approaching the touch panel in the X direction; and
calculate, as a second width corresponding to the object, a width of the object approaching the touch panel in the Y direction.

(9) The touch panel device of (8), wherein
the circuitry is configured to determine whether the operation corresponding to the object is valid based on a comparison of the first and second widths to a first predetermined threshold value and a comparison of a ratio corresponding to the first and second widths to a second predetermined threshold value.

(10) The touch panel device of any of any of (8) and (9), wherein
the circuitry is configured to
compare the first width to a predetermined threshold value; and
determine that the operation corresponding to the object is invalid when the first width is greater than the predetermined threshold value.

(11) The touch panel device of (10), wherein
the circuitry is configured to
compare the second width to the predetermined threshold value when it is determined that the first width is less than the predetermined threshold value; and
determine that the operation corresponding to the object is invalid when the second width is greater than the predetermined threshold value.

(12) The touch panel device of (11), wherein
the circuitry is configured to
calculate a ratio of the second width and the first width when it is determined that the second width is less than the predetermined threshold value; and
compare the ratio to a second predetermined threshold value.

(13) The touch panel device of (12) wherein
the circuitry is configured to determine that the operation corresponding to the object is invalid when the ratio is greater than the second predetermined threshold value and that the operation corresponding to the object is valid when the ratio is less than the second predetermined threshold value.

(14) The touch panel device of (4), wherein
the circuitry is configured to
compare the first width with the second width;
recalculate the first and second widths when the first width is greater than the second width; and
determine that the that input operation is invalid when the first width is less than the second width.

(15) The touch panel device of (14), wherein
the circuitry is configured to
compare the recalculated first and second widths;
determine that the that input operation is invalid when the recalculated first width is less than the recalculated second width; and
determine whether a center of gravity corresponding to the object has changed when the recalculated first width is greater than the recalculated second width.

(16) The touch panel device of (15), wherein
the circuitry is configured to
determine that the operation corresponding to the object is valid when the center of gravity corresponding to the object has not changed; and
determine that the operation corresponding to the object is invalid when the center of gravity corresponding to the object has changed.

(17) The touch panel device of (1), wherein
the touch panel is divided into at least a first detection region and a second detection region, the second detection region surrounding a periphery of the first detection region.

(18) The touch panel device of (17), wherein
the circuitry is configured to
calculate, as the first width corresponding to the object, a width of the object crossing a boundary between the first and second detection regions;
compare the first width to a predetermined threshold value; and
determine whether an input operation corresponding to the object is valid based on the comparison.

(19) A method performed by a touch panel device, the method comprising:
detecting a touch input at a touch panel including a plurality of electrodes arrayed in X and Y directions;
calculating, by circuitry, a width corresponding an object approaching the touch panel based on an output distribution of capacitance values from the touch panel; and
determining, by the circuitry, whether an input operation corresponding to the object is valid based on the calculated width of the object.

(20). A non-transitory computer-readable medium including computer-program instructions, which when executed by a touch panel device, causes the touch panel device to perform a method comprising:
detecting a touch input at a touch panel including a plurality of electrodes arrayed in X and Y directions;
calculating a width corresponding an object approaching the touch panel based on an output distribution of capacitance values from the touch panel; and
determining whether an input operation corresponding to the object is valid based on the calculated width of the object.

The invention claimed is:
1. A touch panel device, comprising:
a touch panel configured to detect a touch input, the touch panel including a plurality of electrodes; and
circuitry configured to:
determine a detection range of an object approaching the touch panel based on an output distribution of capacitance values from the touch panel, the detection range being within a surface area of the touch panel;

determine a first length of the detection range, the first length being a length of the detection range on an edge of the touch panel where the detection range of the object and the edge of the touch panel intersect;

determine a second length of the detection range, the second length being a length of the detection range in a direction substantially parallel to the edge of the touch panel within the surface area of the touch panel;

compare the first length with the second length; and determine an input operation corresponding to the object to be invalid in response to determining that the first length is equal to or larger than the second length.

2. A method, comprising:

detecting, using a touch panel including a plurality of electrodes, a touch input;

determining a detection range of an object approaching the touch panel based on an output distribution of capacitance values from the touch panel, the detection range being within a surface area of the touch panel;

determining a first length of the detection range, the first length being a length of the detection range on an edge of the touch panel where the detection range of the object and the edge of the touch panel intersect;

determining a second length of the detection range, the second length being a length of the detection range in a direction substantially parallel to the edge of the touch panel within the surface area of the touch panel;

comparing the first length with the second length; and determining, using circuitry, an input operation corresponding to the object to be invalid in response to determining that the first length is equal to or larger than the second length.

3. A non-transitory computer readable medium including executable instructions, which when executed by a computer cause the computer to execute a method, the comprising:

detecting a touch input on a touch panel that includes a plurality of electrodes;

determining a detection range of an object approaching the touch panel based on an output distribution of capacitance values from the touch panel, the detection range being within a surface area of the touch panel;

determining a first length of the detection range, the first length being a length of the detection range on an edge of the touch panel where the detection range of the object and the edge of the touch panel intersect;

determining a second length of the detection range, the second length being a length of the detection range in a direction substantially parallel to the edge of the touch panel within the surface area of the touch panel;

comparing the first length with the second length; and determining an input operation corresponding to the object to be invalid in response to determining that the first length is equal to or larger than the second length.

4. The touch panel device of claim 1, wherein the object is a finger of a user, and the touch panel is configured to detect the finger touching the touch panel.

5. The touch panel device of claim 1, wherein the touch panel is rectangular, the first length is a length of the detection range on a side of the touch panel, and the second length is a length of the detection range in a direction substantially parallel to the side of the touch panel.

6. The touch panel device of claim 1, wherein the detection range includes an oval shape, and the second length is a major axis of the oval shape in the direction substantially parallel to the edge of the touch panel.

7. The touch panel device of claim 1, wherein the object is a finger of a user, the touch panel is configured to detect the finger touching the touch panel, the detection range includes an oval shape corresponding to the finger, the touch panel is rectangular, the first length is a length of the detection range on a side of the touch panel, and the second length is a major axis of the oval shape in the direction substantially parallel to the side of the touch panel.

* * * * *